United States Patent [19]

Ohsawa et al.

[11] Patent Number: 5,655,032

[45] Date of Patent: Aug. 5, 1997

[54] CODING METHOD AND APPARATUS THEREFOR

[75] Inventors: Hidefumi Ohsawa, Kawaguchi; Keiji Ishizuka, Kawasaki, both of Japan

[73] Assignee: Canon Kabushiki Kaisha, Tokyo, Japan

[21] Appl. No.: 515,385

[22] Filed: Aug. 15, 1995

Related U.S. Application Data

[63] Continuation of Ser. No. 107,366, Aug. 17, 1993, abandoned.

[30] Foreign Application Priority Data

| Aug. 20, 1992 | [JP] | Japan | 4-221768 |
| Nov. 13, 1992 | [JP] | Japan | 4-303934 |
| Dec. 11, 1992 | [JP] | Japan | 4-331956 |

[51] Int. Cl.$^6$ .................................................. H04N 1/417
[52] U.S. Cl. ........................ 382/238; 382/240; 358/430; 358/261.2
[58] Field of Search .............................. 382/232, 234, 382/238, 239, 240; 358/426, 261.2, 430, 433

[56] References Cited

U.S. PATENT DOCUMENTS

| 4,633,325 | 12/1986 | Usubuchi | 358/430 |
| 4,870,497 | 9/1989 | Chamzas et al. | 358/426 |
| 4,873,577 | 10/1989 | Chamzas | 358/426 |
| 5,031,053 | 7/1991 | Chamzas et al. | 358/426 |
| 5,123,061 | 6/1992 | Pritchard | 382/56 |
| 5,159,468 | 10/1992 | Yoshida et al. | 358/451 |

*Primary Examiner*—Leo Boudreau
*Assistant Examiner*—Chris Kelley
*Attorney, Agent, or Firm*—Fitzpatrick, Cella, Harper & Scinto

[57] ABSTRACT

The present invention discloses a method and apparatus for hierarchical coding of image data using a typical prediction TP if a 2×2 array of pixels can be reduced to coded pixel. The present invention uses a TP flag, TP discrimination and a two line delay. Accordingly, the hierarchical coding can be realized by a small amount of hardware. According to deterministic prediction DP, if there is a decision that the image data may be reduced then the value of the pixel can be predicted from a reduced pixel (low resolution data) and surrounding pixels (high resolution data) which are extracted in advance. If the pixel to be coded is one that can be uniquely determined this pixel is excluded form coding.

9 Claims, 34 Drawing Sheets

(REDUCTION)

[A,B,C,a,b,c,d,e,f,g,h,i] → X

[A,B,C,D,a,b,c,d] → DP VALUE OF e

[A,B,C,D,a,b,c,d,e] → DP VALUE OF f

[A,B,C,D,a,b,c,d,e,f,g] → DP VALUE OF h

[A,B,C,D,a,b,c,d,e,f,g,h] → DP VALUE OF i

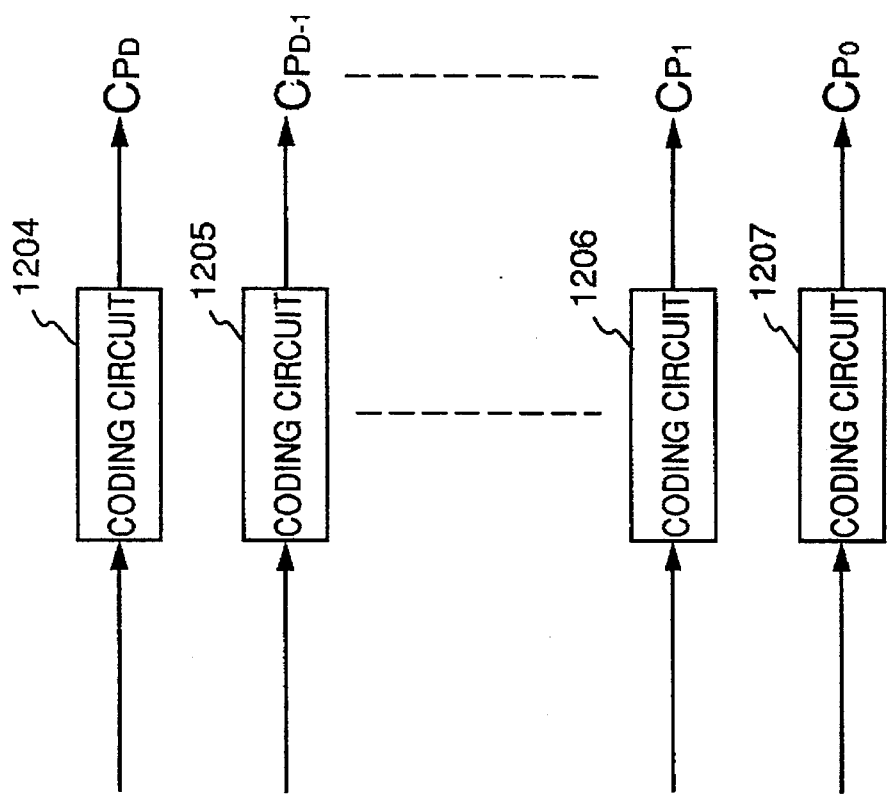
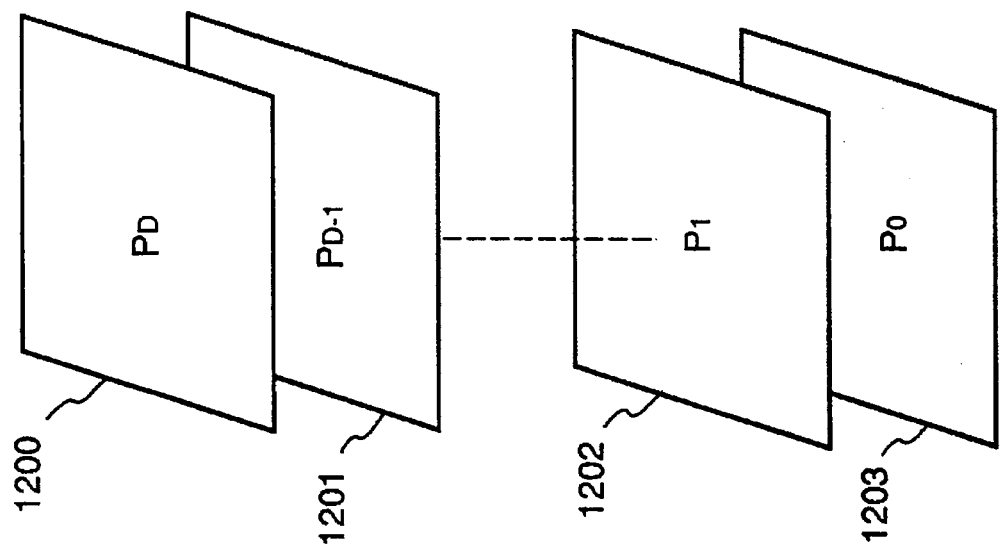

CODING METHOD AND APPARATUS THEREFOR

This application is a continuation of application Ser. No. 08/107,366 filed Aug. 17, 1993 now abandoned.

BACKGROUND OF THE INVENTION

1. Field of the Invention

This invention relates to a coding method and apparatus therefor, particularly a method and apparatus for coding image data. By way of example, the invention is used in still-picture hierarchical coding employed in an image-data service or still-picture filing apparatus.

2. Description of the Related Art

In a facsimile machine, which is a typical example of a still-picture communication apparatus, a binary image is coded using MH or MR coding. These coding methods require that all of the image data be transmitted in order to grasp the entirety of the image. Consequently, in an image-data service, such as a video data-base service or VIDEOTEX, in which it is required that an image be judged in rapid fashion, difficulties are encountered in employing the coding methods used in an apparatus such as a facsimile machine.

Accordingly, in the transmission of a single image, a sequential reproduction method has been proposed in which rough image information is transmitted initially, after which additional information is transmitted to gradually form a detailed image. Coding for the purpose of achieving this is hierarchical coding.

In sequential reproduction, there are many instances in which rough information employs information obtained by reducing the size of the original image. A hierarchy is formed by repeating this reduction processing a number of times. For example, if reduction processing for reduction at a ratio of ½ in the horizontal and vertical directions is applied to an image and then this processing is repeated, images having areas of ¼ and ¹⁄₁₆ will be formed. In sequential reproduction, first data representing the small image of size ¹⁄₁₆ is coded and transmitted, next additional information for forming the image of size ¼ from the image of size ¹⁄₁₆ is coded and transmitted, and then additional information for forming the original image from the image of size ¼ is transmitted.

In order to record the ¼ and ¹⁄₁₆ images at a size the same as that of the original image, the images are outputted upon lowering recording density to ½ and ¼.

Reducing the additional information by as much as possible is very effective in curtailing transmission time. Accordingly, a large number of proposals concerning coding preprocessing have been considered, namely preprocessing in which portions of an image having a much larger size that can be predicted from an image of a smaller size are excluded from coding.

Typical prediction (hereinafter referred to as "TP") is an effective means of performing such coding preprocessing.

According to TP, two-lines, for example, are adopted as a block line. If a 2×2 array of four pixels to be coded, the reduced pixel corresponding to these pixels and the peripheral pixels surrounding it, for a total of nine pixels, are of the same color, then the 2×2 array of pixels are capable of TP. Accordingly, the 2×2 array of pixels are excluded from coding.

More specifically, a TP flag attached to the beginning of a block line is made "0" if a pixel that is the object of coding is capable of TP based upon the reduced pixel. If there is an exception and TP is impossible, then the TP flag is made "1" With-regard to a block line for which the TP flag is "0", a pixel capable of TP is excluded from coding and all other pixels are subjected to the usual coding. In case of block lines for which the TP flag is "1", all of the pixels are subjected to the usual coding.

Deterministic prediction (hereinafter referred to as "DP") also is an effective means of performing coding preprocessing.

According to DP, if there is a rule that has been decided as a method of reducing an image, then a pixel, which is the object of coding, and whose on/off state (i.e., a pixel value of "1" or "0") can be predicted from a reduced pixel (low-resolution pixel data) and surrounding pixels (high-resolution pixel data) of the pixel which is the object of coding by making a reverse inference from the rule, is extracted in advance. If the pixel which is the object of coding is one that can be uniquely determined at the time of coding, this pixel is excluded from coding. At decoding, the on/off state of a pixel which is the object of decoding is uniquely determined from the low-resolution pixel data and high-resolution pixel data already decoded.

However, certain problems arise in the techniques described above.

Specifically, in coding using TP, it is necessary to judge whether TP is possible or not. In order to make this judgment, pixels which are the object of coding, a reduced pixel corresponding to these pixels and pixels surrounding this reduced pixel must be investigated every block line by prescanning, and it is required that the TP flag be attached to the beginning of each block line. Consequently, in coding using TP, it is necessary to refer to reduced pixels and the peripheral pixels a number of times. The hardware required to accomplish this is very complicated.

In coding using DP, as illustrated in FIG. 23, first the entire image is subjected to reduction processing at step S1000, the entirety of the reduced image is stored temporarily in a frame memory, and then DP is performed at step S1001. As a result, processing takes time. In addition, since a frame memory for storing the reduced image is required, a greater amount of hardware is necessary.

Furthermore, as set forth in the ISO/IEC (Committee Draft 11544, etc.), a plurality of means for raising coding efficiency are successively applied to each item of image data in order, after which predictive coding is performed. In order to accomplish this, processing is executed by an arrangement of the kind shown in FIG. 34. To describe this, TP for minimum resolution set forth in ISO/IEC (Committee Draft 11544, etc.) will be taken as an example.

According to TP for minimum resolution, if the image on a line presently undergoing coding is identical with the entirety of the image on the line immediately above it, a prediction flag, which indicates whether a hit has been attained with regard to a prediction, is coded and the image data is excluded from coding. On the other hand, if the image on a line presently undergoing coding differs by even one pixel from the image on the line immediately above it, a prediction flag indicating that the prediction was erroneous is coded and the image data is coded as well.

An arrangement for implementing this processing will be described with reference to FIG. 34.

As shown in FIG. 34, an image data memory 500 delivers its output to a block 501 that executes TP processing. The results of TP processing enter a prediction-flag memory 502, the output of which is applied to a prediction coder 503. The latter outputs a code.

Binary image data which is the object of coding is stored in the image data memory 500. The TP block 501 reads image data, in sets of two lines each, out of the image data memory 500 and, if agreement with a prediction is achieved, writes a flag indicative of agreement with the prediction in the prediction-flag memory 502.

The prediction coder 503 reads image data out of the image data memory 500 and the prediction flag out of the prediction-flag memory 502. If agreement with a prediction is achieved, only the prediction flag is coded and the line thereof is excluded from the object of coding. If there is no agreement with a prediction, the prediction coder 503 codes the prediction flag and successively codes the pixels of this line, thereby outputting a code.

Though the foregoing description relates to TP as an example, a code output can be obtained by similar processing even with another arrangement having means for raising prediction efficiency or means for performing a resolution transformation.

A problem encountered in the technique described above is that coding processing cannot start until the processing performed by the means for raising coding efficiency or by the means for performing resolution conversion no longer has an effect upon the coder. This means that the technique does not lend itself to synchronous coding on a real-time basis.

SUMMARY OF THE INVENTION

An object of the present invention is to provide a coding method and apparatus whereby hierarchical coding can be performed merely by referring to pixels to undergo coding and reduced pixels a single time in coding using TP, this being accomplished by a small amount of hardware.

According to the present invention, the foregoing object is attained by providing a coding method for hierarchically coding image data, comprising a generating step of transforming first image data so as to generate second image data having a resolution lower than that of the first image data, a setting step of setting a first flag every prescribed line and a second flag in pixel units in dependence upon features of the first image data and features of the second image data, and a coding step of coding the first image data in dependence upon the first flag and second flag.

Further, according to the present invention, the foregoing object is attained by providing a coding apparatus for hierarchically coding image data, comprising generating means for transforming first image data so as to generate second image data having a resolution lower than that of the first image data, setting means for setting a first flag every prescribed line and a second flag in pixel units in dependence upon features of the first image data and features of the second image data, and coding means for coding the first image data in dependence upon the first flag and second flag.

Another object of the invention is to provide a coding method and apparatus whereby processing speed is raised and the amount of hardware can be reduced by dispensing with a frame memory for storing a reduced image.

According to the present invention, the foregoing object is attained by providing a coding method for hierarchically coding image data, comprising a generating step of transforming first image data in accordance with a prescribed rule so as to generate second image data having a resolution lower than that of the first image data, a detecting step of, when a value of a reduced pixel is decided by the generating step, detecting a pixel of the first image data the value of which is capable of being uniquely predicted using the prescribed rule, and a coding step of coding the first image data in conformity with the result of detection performed by the detecting step.

Further, according to the present invention, the foregoing object is attained by providing a coding apparatus for hierarchically coding image data, comprising generating means for transforming first image data in accordance with a prescribed rule so as to generate second image data having a resolution lower than that of the first image data, detecting means which, when a value of a reduced pixel is decided by the generating means, is for detecting a pixel of the first image data the value of which is capable of being uniquely predicted using the prescribed rule, and coding means for coding the first image data in conformity with the result of detection performed by the detecting means.

Still another object of the invention is to provide a coding apparatus suited to high-speed processing independently of processing for raising coding efficiency or processing for performing a resolution transformation.

According to the present invention, the foregoing object is attained by providing a coding apparatus having efficiency raising means for raising coding efficiency or transformation means for performing a resolution transformation, the apparatus comprising input means for entering, in parallel, a plurality of items of image data delayed one line at a time in a sub-scan direction, coding means for coding the image data, and delay means for subjecting the plurality of items of image data entered by the input means to a delay main-scan direction necessary for allowing the efficiency raising means or transformation means and the coding means to perform processing, the efficiency raising means or transformation means and the coding means executing processing at the same time upon obtaining the image data from the delay means simultaneously.

Other features and advantages of the present invention will, be apparent from the following description taken in conjunction with the accompanying drawings, in which like reference characters designate the same or similar parts throughout the figures thereof.

BRIEF DESCRIPTION OF THE DRAWINGS

FIG. 30A is a diagram illustrating binary image data;

FIG. 30B is a block diagram illustrating the configuration of a coding apparatus according to a ninth embodiment of the present invention;

DESCRIPTION OF THE PREFERRED EMBODIMENTS

A coding method and apparatus according to preferred embodiments of the present invention will now be described in detail with reference to the drawings.

(First Embodiment)

Figure 1:
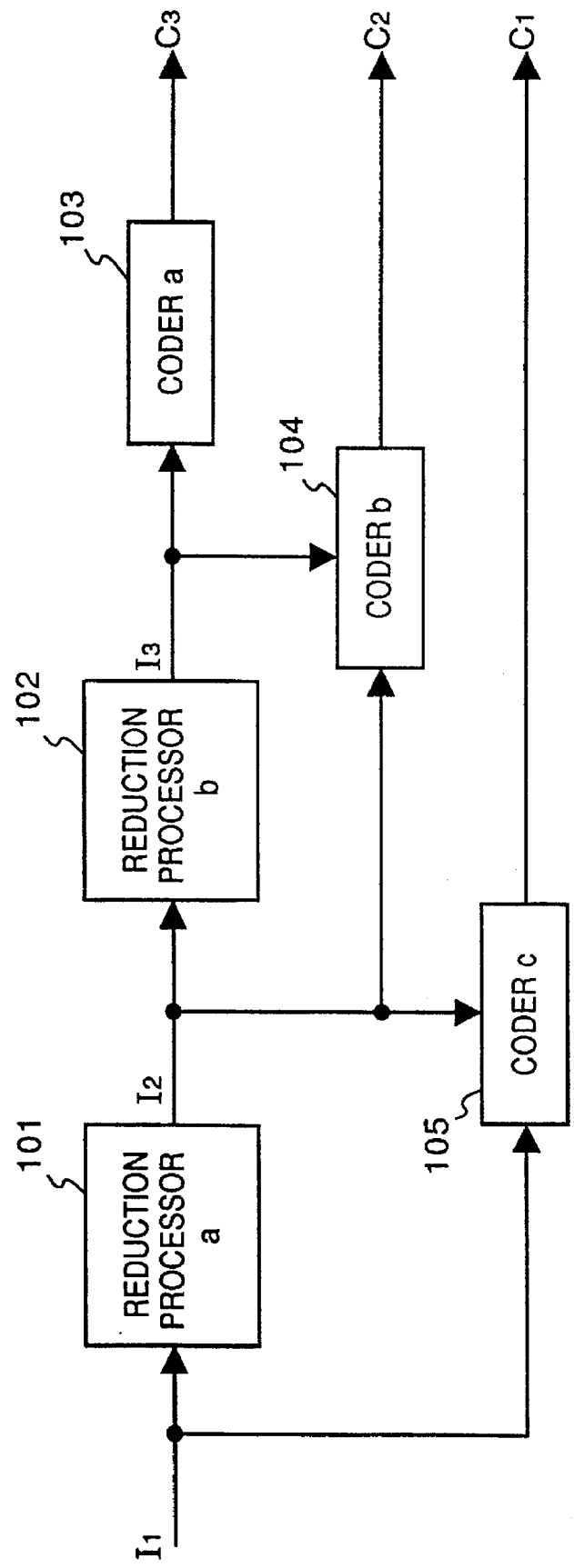
FIG. 1 is a block diagram illustrating the configuration of a hierarchical coder.

FIG. 1 is a block diagram illustrating the configuration of a hierarchical coder.

As shown in FIG. 1, the hierarchical coder includes a reduction processor (a) 101 for subjecting entered original image data $I_1$ to reduction processing to reduce the data to ½ the size in longitudinal and horizontal directions, thereby outputting reduced image data $I_2$ having ¼ the area. The image data $I_2$ is applied to a reduction processor (b) 102, which subjects the reduced image data $I_2$ to reduction processing to further reduce the data to ½ the size in the longitudinal and horizontal directions, thereby outputting reduced image data $I_3$ having 1/16 the area. A coder (a) 103 subjects the entered reduced image data to coding compression. Code data $C_3$ outputted by the coder (a) 103 is the result of applying further coding compression to the image data $I_3$ obtained by reducing the original image data $I_1$ to 1/16 the amount of data. Thus the code data $C_3$ is of a very small amount in comparison with the original image data $I_1$. In other words, owing to transmission initially of the code data $C_3$ outputted by the coder (a) 103 from the transmitting side, it is possible to ascertain the general nature of the transmitted image, even though the image is small in size, by decoding the code data $C_3$ on the receiving side.

A coder (b) 104 refers to the reduced image data $I_3$ and outputs code data $C_2$ obtained by subjecting the reduced image data $I_2$ to coding compression. A coder (c) 105 refers to the reduced image data $I_2$ and outputs code data $C_1$ obtained by subjecting the original image data $I_1$ to coding compression.

Figure 2:
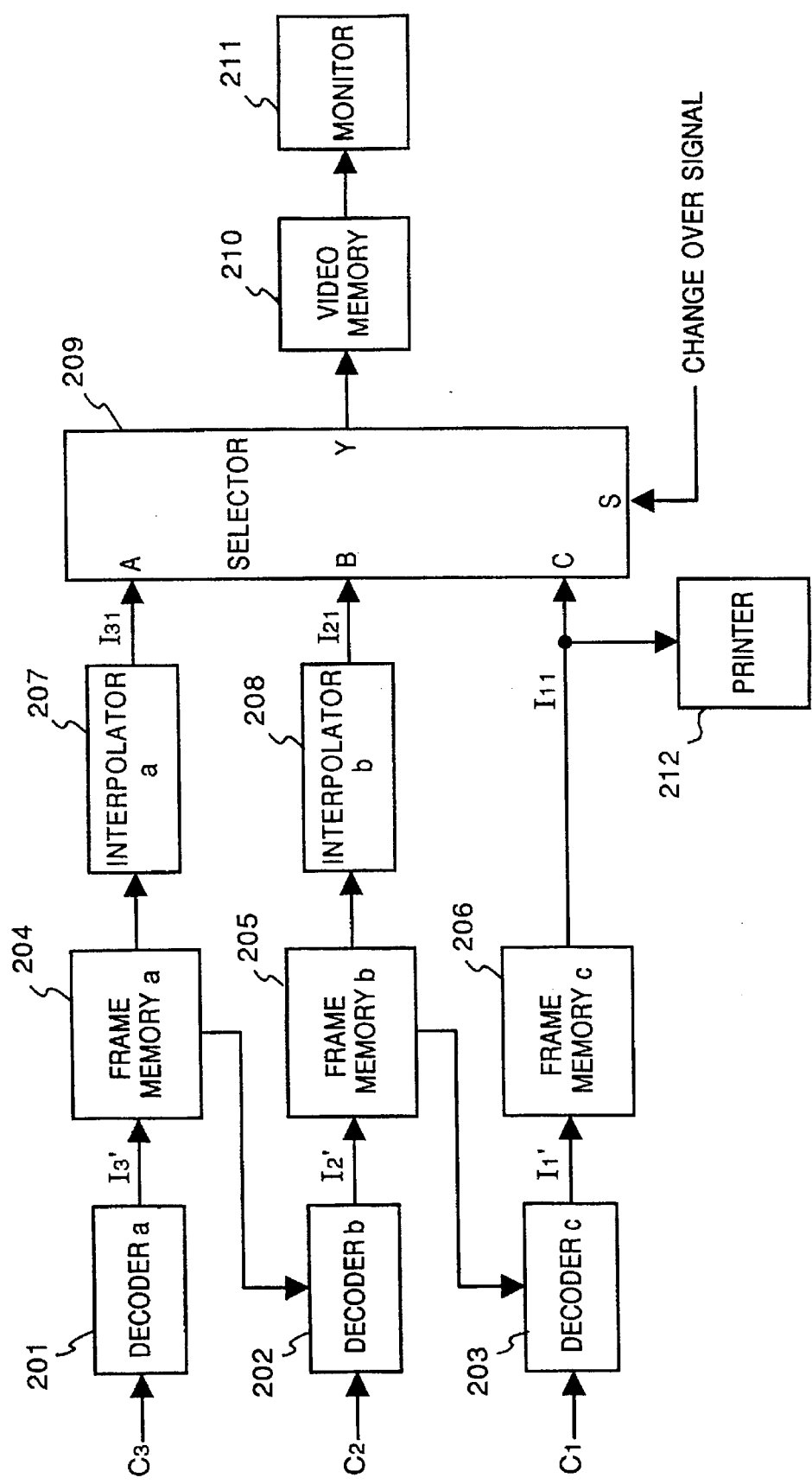
FIG. 2 is a block diagram illustrating the configuration of a hierarchical decoder.

FIG. 2 is a block diagram illustrating the configuration of a hierarchical decoder.

As shown in FIG. 2, a decoder (a) 201 decodes the code data applied thereto. A frame memory (a) 204 stores decoded image data $I_3'$ outputted by the decoder (a) 201. An interpolator (a) 207 subjects the decoded image data $I_3'$ stored in the frame memory (a) 204 to interpolation processing to obtain the required size (e.g., a size increased four times in the horizontal and vertical directions).

A decoder (b) 202 applies the decoded image data $I_3'$ as a prediction reference and codes the entered code data $C_2$. A frame memory (b) 205 stores decoded image data $I_2'$ outputted by the decoder (b) 202. An interpolator (b) 208 subjects the decoded image data $I_2'$ stored in the frame memory (b) 205 to interpolation processing to obtain the required size (e.g., a size doubled in the horizontal-vertical directions).

A decoder (c) 203 applies the decoded image data $I_2'$ as a prediction reference and codes the entered code data $C_1$. A frame memory (c) 206 stores decoded image data $I_1'$ outputted by the decoder (c) 203.

In dependence upon a changeover signal applied to a selection-signal input terminal S from a controller (not shown), a selector 209 selects and outputs image data $I_{31}$ applied to an input terminal A from the interpolator (a) 207, image data $I_{21}$ applied to an input terminal B from the interpolator (b) 208, and image data $I_{11}$ applied to an input terminal C from the frame memory (c) 206. A video memory 210 stores the image data outputted by the selector 209. A monitor 211 displays an image based upon the image data stored in the video memory 210. A printer 212 prints out a hard copy of the image based upon the image data $I_{11}$ outputted by the frame memory (c) 206.

Figure 3:
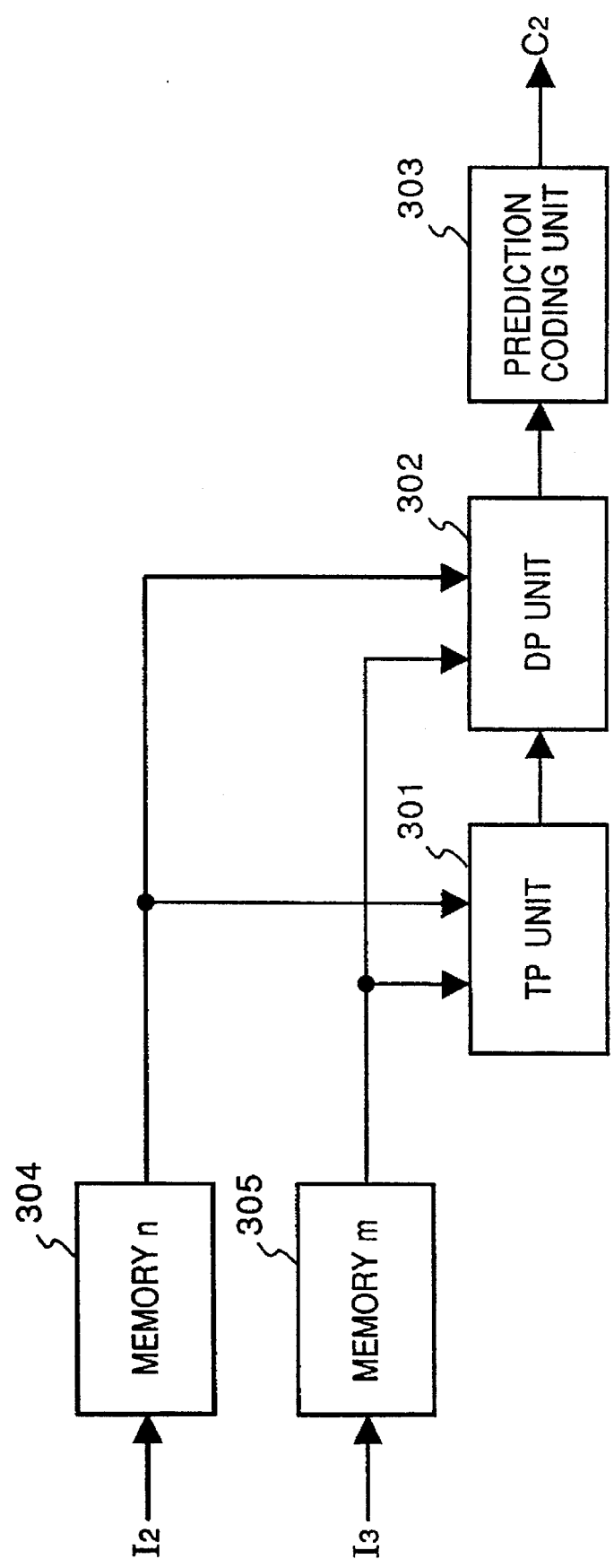
FIG. 3 is a block diagram illustrating the configuration of a coder shown in FIG. 1.

FIG. 3 is a block diagram illustrating the configuration of the coder (b) 104. It should be noted that the coder (c) 105 and coder (a) 103 have the same construction as the coder (b) 104. In this embodiment, arithmetic coding described in ISO/IEC (Committee Draft 11544) is carried out.

As shown in FIG. 3, a memory (n) 304 stores a pixel which is the object of coding, as well as the peripheral pixels surrounding this pixel, from the reduced image data $I_2$. A memory (m) 305 stores several lines of data of the reduced image data $I_3$. The image data stored in the memories 304, 305 is outputted to a predicting unit, described below, so as to be utilized as prediction reference pixels.

In order that pixels capable of being predicted on the decoding side may be excluded from Coding, a TP (typical prediction) unit 301 is provided. If several pixels of the reduced image data $I_2$ entering from the memory (n) 304 and several pixels of the reduced image data $I_3$ entering from the memory (m) 305 are identical in color, the TP unit 301 excludes from coding the pixels of the reduced image data $I_2$ that correspond to these pixels.

Pixels surrounding a pixel to be subjected to coding enter a DP (deterministic prediction) unit 302 from the memory (n) 304, and the reduced image data $I_3$ enters the DP unit 302 from the memory (m) 305. If a pixel to be subjected to coding that has entered from the TP unit 301 is capable of being uniquely determined in accordance with the reduction method used, the DP unit 302 excludes this pixel from coding by referring to the data applied thereto from the memories 304, 305.

A prediction coding unit 303 applies prediction coding to the image data applied thereto by the DP unit 302.

Figure 4:
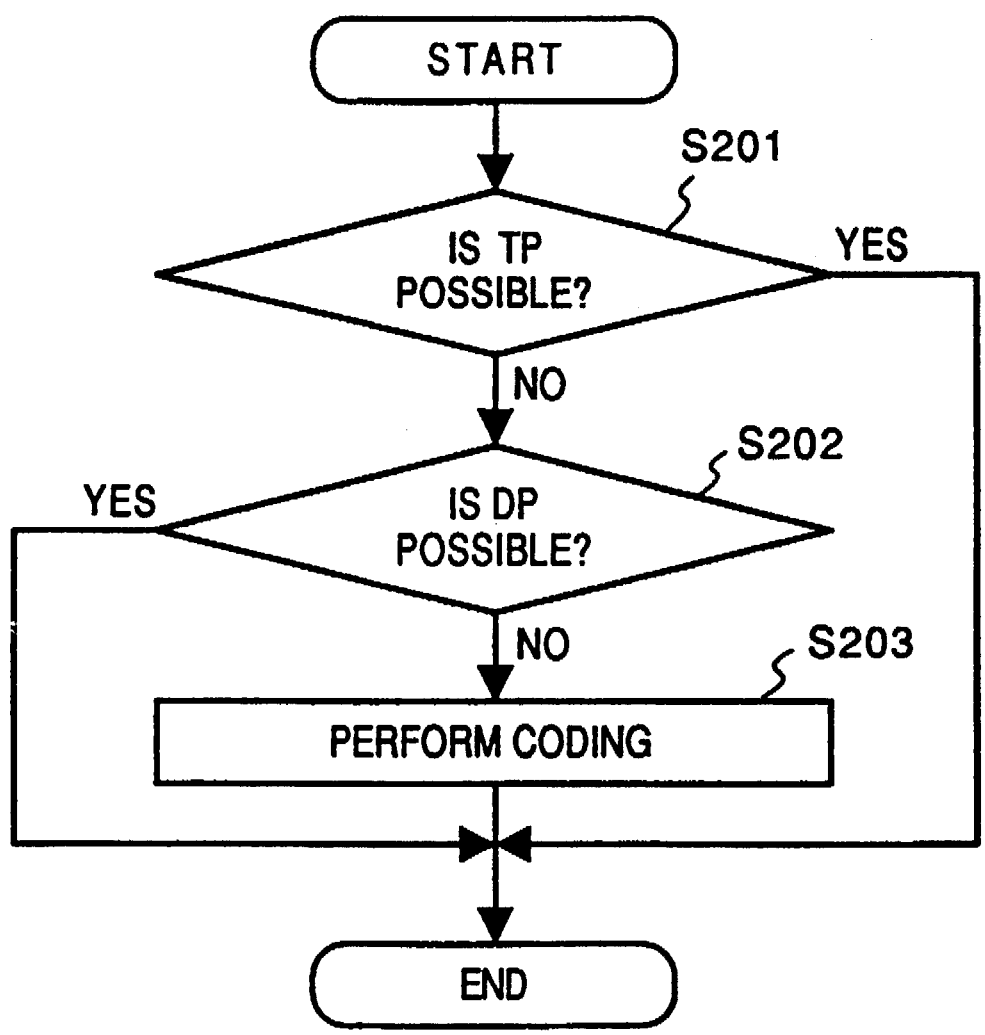
FIG. 4 is a flowchart illustrating coding processing executed by the coder shown in FIG. 3.

FIG. 4 is a flowchart illustrating the coding processing executed by the coder (b) 104, namely the processing for coding any pixel which is the object of coding. It should be noted that coders (c) 105 and (a) 103 also execute coding processing through the same processing flow.

As shown in FIG. 4, the coder judges at step S201 whether a typical prediction (TP) of a pixel which is the object of coding is possible or not. Processing proceeds to step S202 if prediction is impossible and is terminated if prediction is possible.

Next, the coder judges at step S202 whether a deterministic prediction (DP) of a pixel which is the object of coding is possible or not. Processing proceeds to step S203 if prediction is impossible and is terminated if prediction is possible.

The coder performs coding of the pixel which is the object of coding at step S203, after which processing is concluded.

Figure 5:
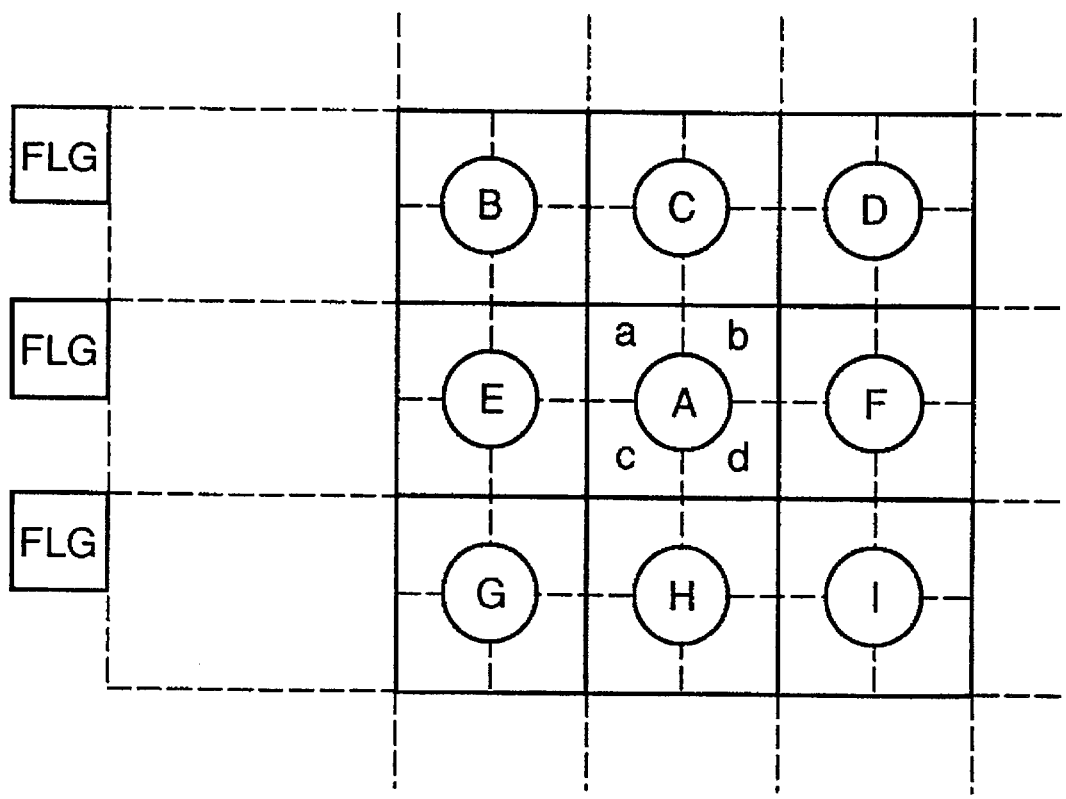
FIG. 5 is a diagram illustrating the relationship between pixels which are the object of coding and reduced pixels in the coder shown in FIG. 3.

FIG. 5 is a diagram illustrating the relationship between pixels which are the object of coding and reduced pixels in the coder (b) 104. The circles in FIG. 5 represent reduced pixels and the small squares represent pixels which are the object of coding. The relationship between the pixels which are the object of coding and the reduced pixels is the same in the coders (c) 105 and (a) 103 as well.

As shown in FIG. 5, one reduced pixel A corresponds to four pixels a, b, c, d which are the object of coding. The same is true with regard to the other reduced pixels as well. FLG represents a TP flag, which is appended to the left end of each of the lines constituted by the reduced pixels. Two lines, namely a line including the pixels a, b which are the object of coding and a line including the pixels c, d which are the object of coding are referred to as a block line.

In TP, reference is made to the pixels a~d (FIG. 5) which are the object of coding and to the reduced pixels A~I, a rule is adopted to the effect that if the reduced pixels A·I are of the same color, then the pixels a~d which are the object of coding are also of the same color, and a judgment is made as to whether this rule holds. The flag FLG conforming to the judgment made is set for every block line. More specifically, FLG="0" indicates that the rule holds throughout the block line and FLG="1" indicates that a case in which the rule does not hold exists on the block line.

Figure 6:
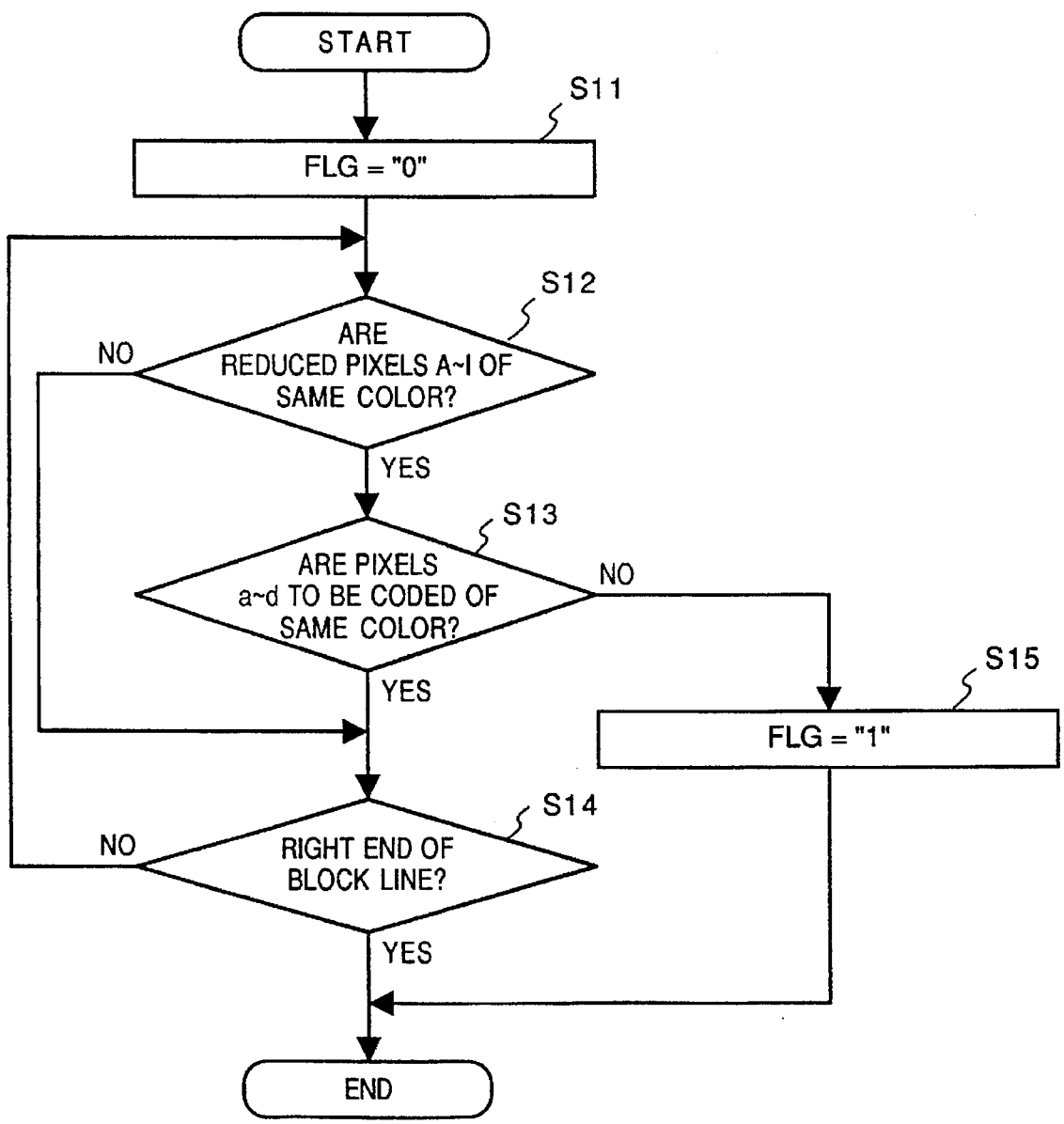
FIG. 6 is a flowchart illustrating a procedure through which a flag is set in ordinary TP processing.

FIG. 6 is a flowchart illustrating a procedure through which the flag FLG is set in ordinary TP processing.

As shown in FIG. 6, the coder sets FLG="0" at step S11 and determines at step S12 whether the reduced pixels A~I are all identical in color. Processing proceeds to step S13 if all of these pixels are identical in color or jumps to step S14 if these pixels contain a pixel of a different color.

If the reduced pixels A~I are all identical in color, the coder determines at step S13 whether the pixels a~d which are the object of coding are all identical in color. Processing proceeds to step S14 if all of these pixels are identical in color or proceeds to step S15 if these pixels contain a pixel of a different color. The coder sets FLG="1" at step S15 and then terminates processing.

At step S14, the coder discriminates the position of the pixel being processed. If this pixel is not at the right end of the block line, processing returns to step S12. If this pixel is at the right end of the block line, then processing is terminated. In other words, the coder detects pixels for which the above-mentioned rule does not hold and repeats the processing of steps S12~S14 until the pixel undergoing processing reaches the right end of the block line. If processing is concluded upon traversing step S14, the relation FLG="0" will hold.

Figure 7:
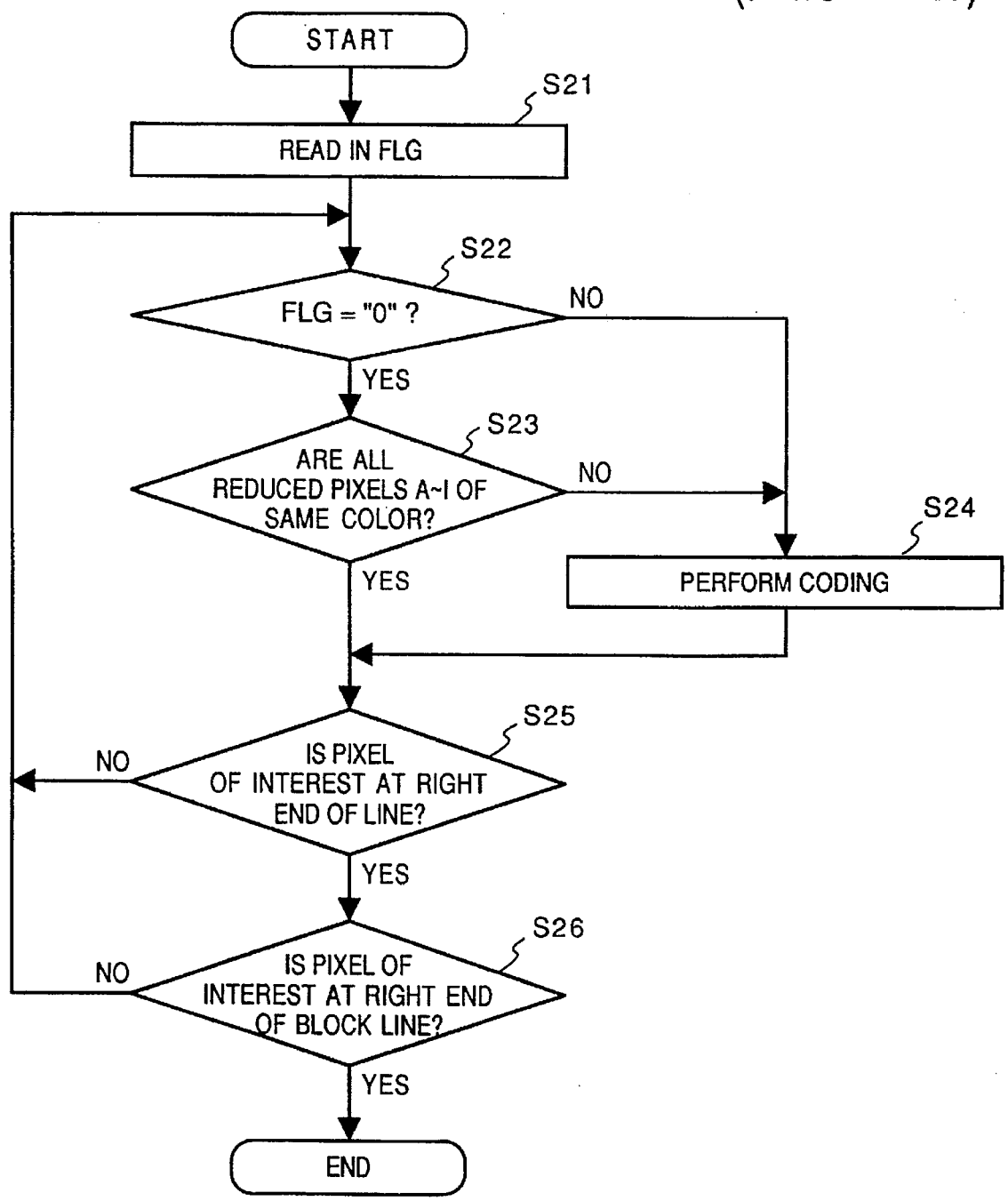
FIG. 7 is a flowchart illustrating a procedure through which a TP value is decided in pixel units in ordinary TP processing.

FIG. 7 is a flowchart illustrating a procedure through which a TP value is decided in pixel units in ordinary TP processing. This indicates the processing for one block line.

As shown in FIG. 7, the coder reads in FLG at step S21 and discriminates the value of the read flag FLG at step S22. Processing proceeds to step S23 if FLG="0" holds and to step S24 if FLG="1" holds.

If FLG="0" holds, the coder determines at step S23 whether the reduced pixels A~I are all identical in color. Processing proceeds to step S25 without execution of coding if all of these pixels are identical in color or proceeds to step S24 if these pixels contain a pixel of a different color.

If FLG="1" holds or the reduced pixels A~I contain a pixel of a different color, the coder codes the pixel of interest at step S24, after which processing proceeds to step S25. Here it is determined whether the pixel of interest is at the right end of the line. If this pixel is not at the right end of the line, processing returns to step S22. If this pixel is at the right end of the line, then processing proceeds to step S26. In other words, the coder repeats the processing of steps S22~S25 until the pixel of interest reaches the right end of the line.

When the pixel of interest reaches the right end of the line, it is determined at step S26 whether the pixel of interest is at the right end of the second line of the block line. If this pixel is not at the right end of the second line, processing returns to step S22. If the pixel is at the right end of the second line, then processing is terminated. In other words, the coder repeats the processing of FIG. 7 every block line to process all of the image data.

As illustrated in FIGS. 6 and 7, it is required that the reduced pixels A~I be referred to twice in ordinary TP processing.

Figure 8:
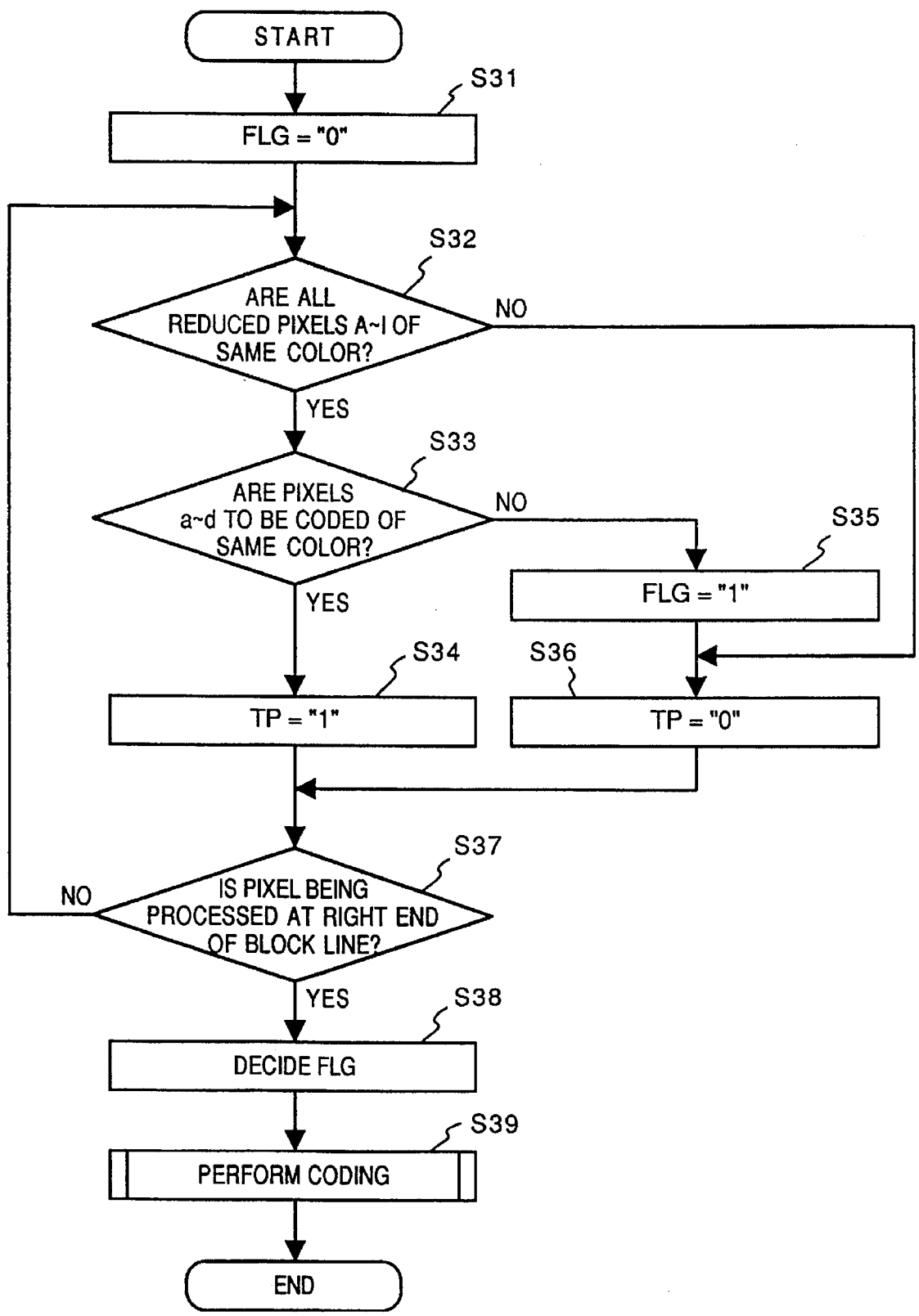
FIG. 8 is a flowchart illustrating ordinary TP processing according to the present invention.

FIG. 8 is a flowchart illustrating TP processing according to the present invention.

According to this embodiment, as shown in FIG. 8, FLG="0" is set at step S31, after which it is determined at step S32 whether all of the reduced pixels A~I are identical in color. Processing proceeds to step S33 if all of these pixels are identical in color or proceeds to step S36 if these pixels contain a pixel of a different color.

If all of the reduced pixels A~I are of identical color, it is determined at step S33 whether all of the pixels a~d which are the object of coding are identical in color. Processing proceeds to step S34 if all of these pixels are identical in color or to step S35 if these pixels contain a pixel of a different color.

If all of the pixels a~d which are the object of coding are identical in color, TP="1" is set for the pixels a~d at step S34, after which processing proceeds to step S37. If pixels a~d contain a pixel of a different color, FLG="1" is set at step S35, after which processing proceeds to step S36.

If the reduced pixels A~I are all identical in color or if the pixels a~d which are the object of coding contain a pixel of a different color, TP="0" is set for the pixels a~d at step S36, after which processing proceeds to step S37.

It is determined at step S37 whether the pixel undergoing processing is at the right end of the second line of the block line. If this pixel is at the right end of the second line, processing proceeds to step S38. If the pixel is not at the right end of the second line, then processing returns to step S32. In other words, according to this embodiment, the coder repeats the processing from step S32 to step S37 until the pixel undergoing processing reaches the right end of the second line of the block line.

When the pixel undergoing processing reaches the right end of the second line of the block line, FLG is decided at step S38 and coding processing, described later, is executed at step S39. In this embodiment, a state in which coding can be executed is attained after FLG is decided. Accordingly, it is necessary to store the pixel data which is the object of coding as well as the TP value thereof by means of a two-line buffer or the like until coding is executed.

Figure 9:
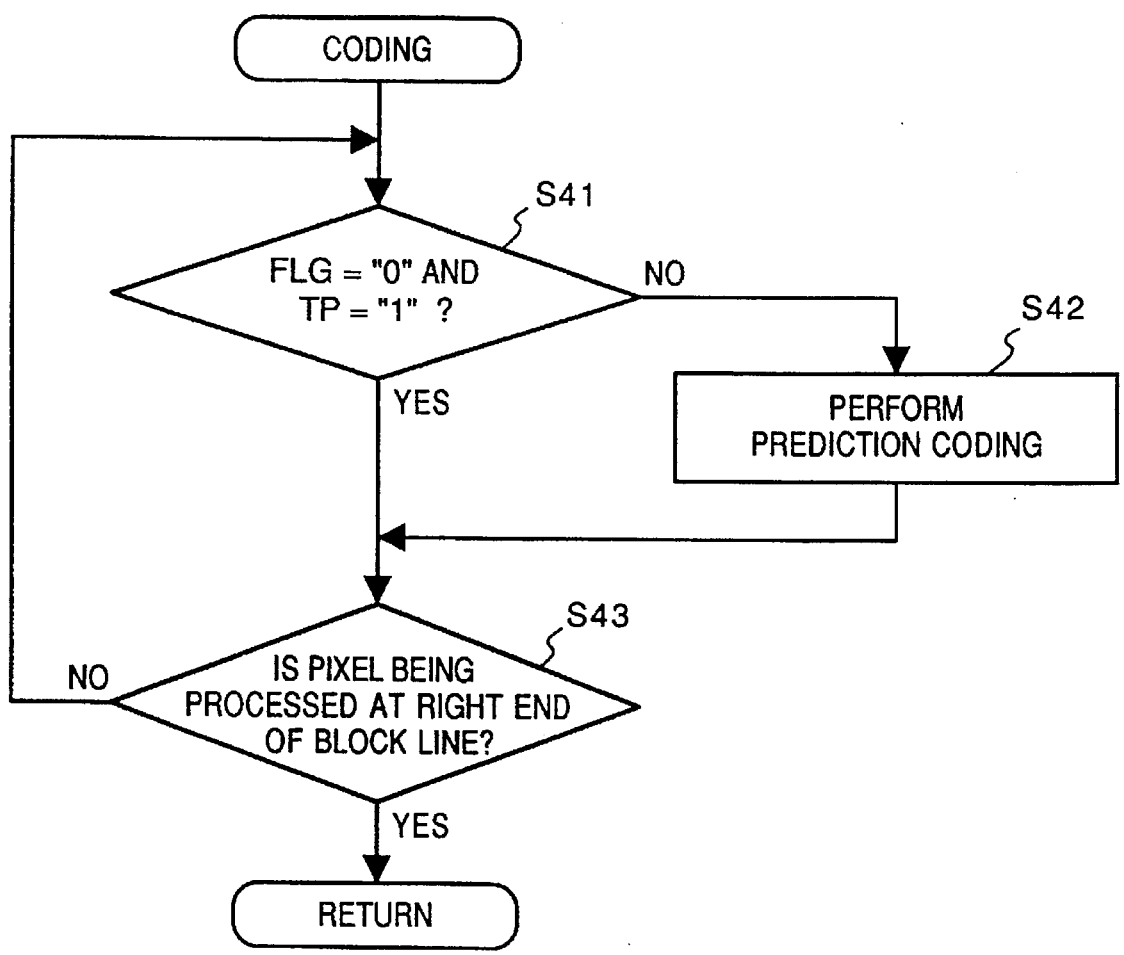
FIG. 9 is a flowchart illustrating the details of "CODING" processing shown in FIG. 8.

FIG. 9 is a flowchart illustrating a procedure for coding. This flowchart corresponds to step S39 in FIG. 8.

According to this embodiment as shown in FIG. 9, FLG and TP of a pixel which is the subject of coding are discriminated at step S41. Processing proceeds to step S43 if FLG="0" and TP="1" hold. If these conditions are not satisfied, processing proceeds to step S42, at which this pixel is subjected to prediction coding. Processing then proceeds to step S43. In other words, according to this embodiment, production coding of step S42 is not traversed if the typical-prediction rule holds (i.e., if FLG="0" holds) on a block line that includes a pixel which is the object of coding and this pixel is judged to be capable of TP (i.e., if TP="1" holds).

Next, at step S43, it is determined whether the pixel undergoing processing is at the right end of the second line of the block line. Processing returns to step S41 if this pixel is not at the right end of the second line. Processing is concluded if this pixel is at the right end of the second line. In other words, according to this embodiment, the processing of steps S41 to 43 is repeatedly executed until the pixel undergoing processing reaches the right end of the second line of the block line.

Figure 10:
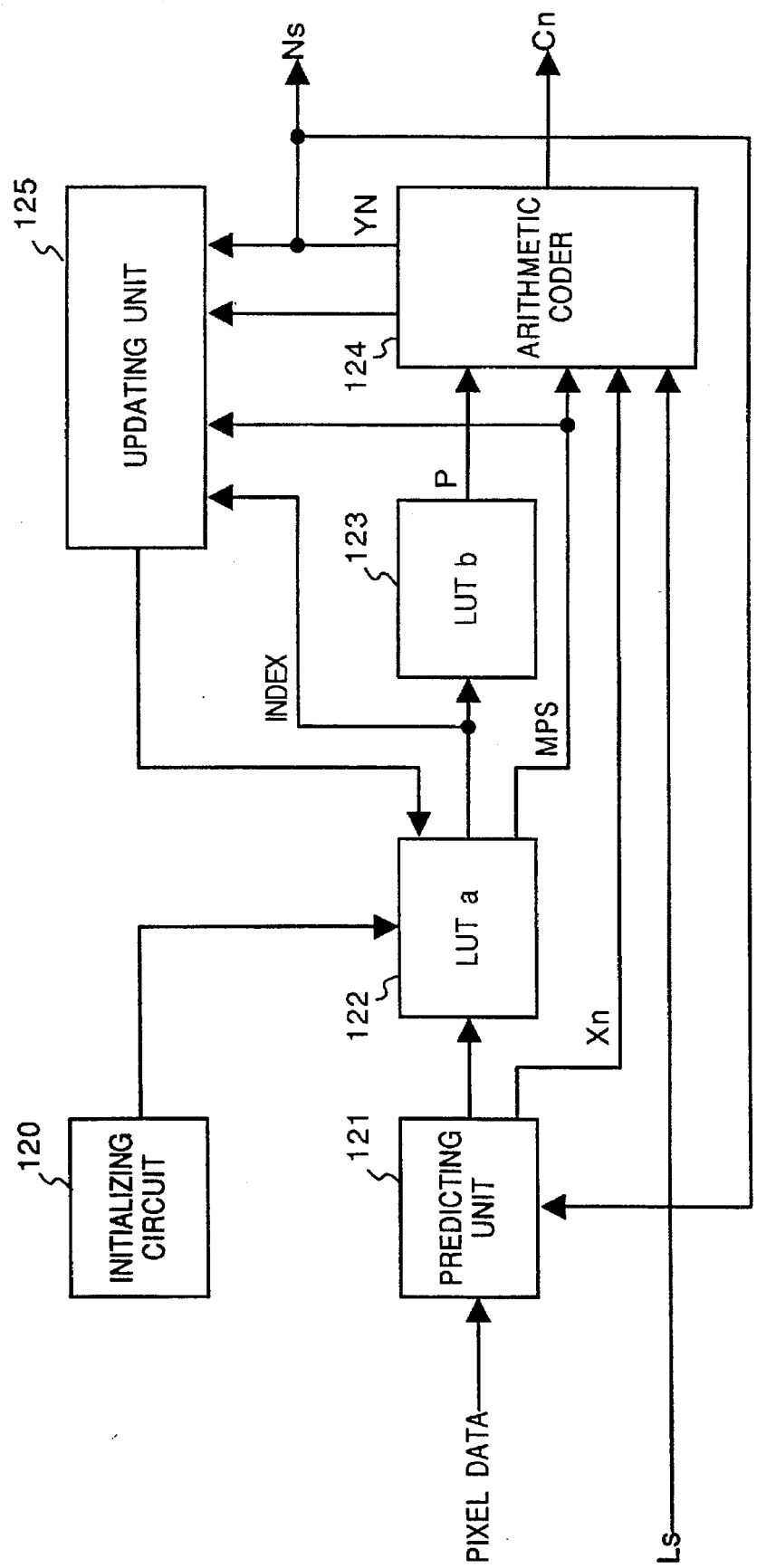
FIG. 10 is a block diagram illustrating the configuration of a prediction coding unit according to a first embodiment of the present invention.

FIG. 10 is a block diagram illustrating the configuration of the prediction coding unit 303 according to this embodiment. In this prediction coding unit, a coding operation indicated in ISO/IEC (Committee Draft 11544) is executed.

As shown in FIG. 10, numeral 121 denotes a predicting unit for deciding a prediction state from peripheral-pixel data that has entered from an external line buffer (not shown) and outputting the prediction state and a coding symbol Xn in dependence upon a signal Ns, described later.

Numeral 122 denotes a LUT (look-up table) (a) constituted by a RAM or the like. This is a prediction-state memory which, in dependence upon the prediction state that has entered from the prediction unit 121, outputs a storage index INDEX and a superiority symbol MPS. The LUT (a) 122 has its stored data initialized (e.g., INDEX="0", MPS= "0") by an initializing circuit 120, and the stored data in the LUT (a) 122 is updated by an updating unit 125, described later.

Numeral 123 denotes a LUT (b), which is constituted by a ROM or the like. The LUT (b) 123 is an arithmetic-parameter memory for storing an inferiority symbol P, which indicates the probability that a prediction will fail, and outputting the inferiority symbol P that conforms to the INDEX inputted from the LUT (a) 122.

The coding symbol Xn from the predicting unit 121, the superiority symbol MPS from the LUT (a) 122 and the inferiority symbol P from the LUT (b) 123 enter an arithmetic coder 124, which performs arithmetic coding dynamically to output arithmetic-code data Cn, the signal Ns, which is for requesting the next coding symbol, and a signal YN indicating the state of coincidence between the coding symbol Xn and the superiority symbol MPS. A signal Ls applied to the arithmetic coder 124 as an input indicates the final bit of the coded data sent from an external controller (not shown). The signals Ns and YN from the arithmetic coder 124 and the index INDEX and superiority signal MPS from the LUT (a) 122 enter an updating unit 125, which proceeds to update the index INDEX and superiority signal MPS.

Figure 11:
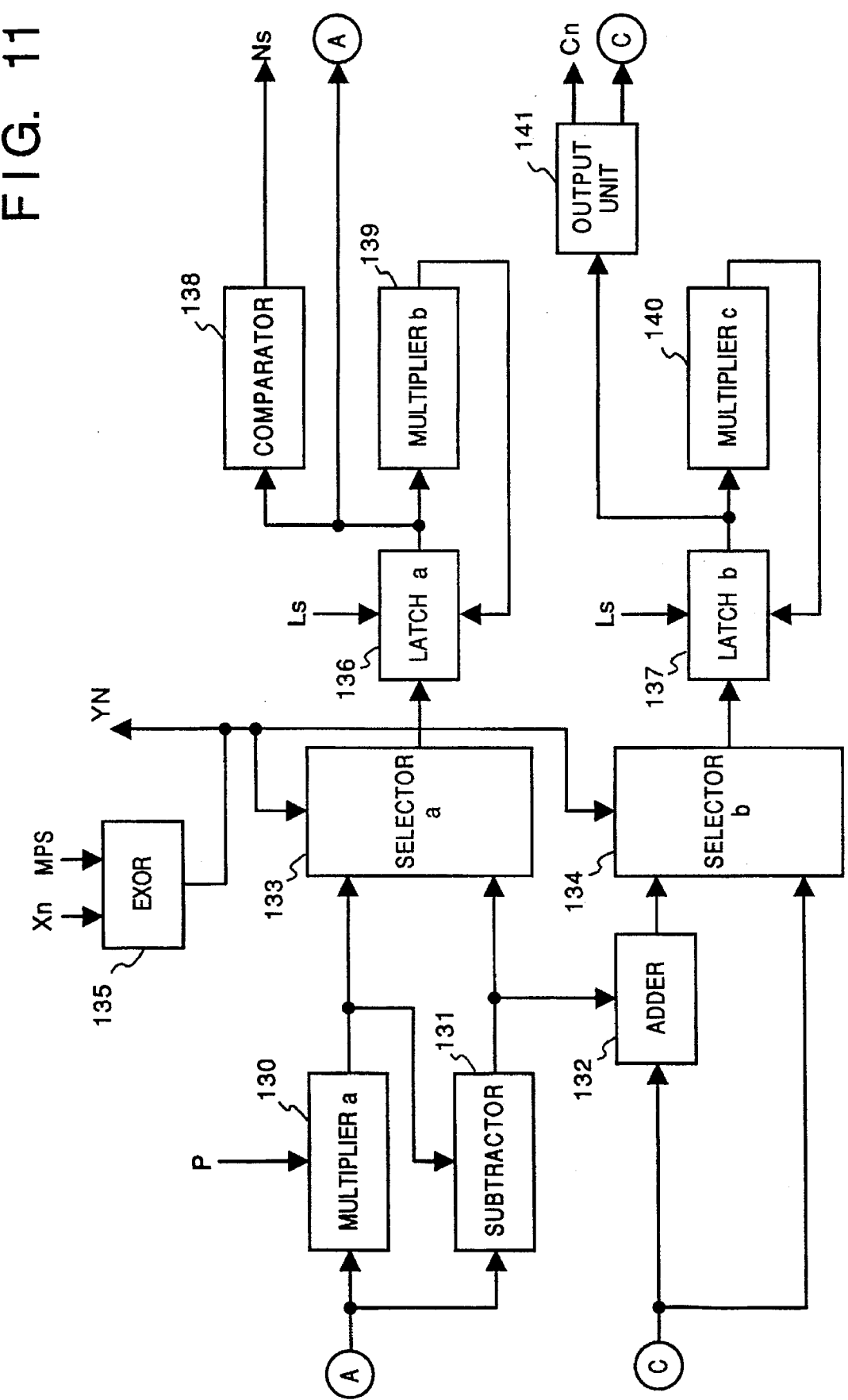
FIG. 11 is a block diagram illustrating the configuration of an arithmetic coder shown in FIG. 10.

FIG. 11 is a block diagram illustrating the configuration of the arithmetic coder 124.

As shown in FIG. 11, a multiplier (a) 130 multiplies the inferiority symbol P by the output of a latch (a) 136, described below, and a subtractor 131 subtracts the output of the multiplier (a) 130 from the output of the latch (a) 136. An adder 132 adds the output of the subtractor 131 and the output of an output unit 141, described below.

In dependence upon an output from an exclusive-OR circuit 135, a selector (a) 133 selects and outputs the data from the multiplier (a) 130 or the data from the subtractor 131. Further, in dependence upon the output from the EXOR 135, a selector (b) 134 selects and outputs the data from the adder 132 or the data from the output unit 141. The coding symbol Xn and the superiority symbol MPS enter the EXOR 135, which takes the exclusive-OR of these symbols and outputs the result. This output is the aforementioned signal YN.

A latch (a) 136 latches the output of the selector (a) 133 and the output of the multiplier (b) 139. The latch (a) 136 is initialized by the signal Ls. A comparator 138 outputs the signal Ns from the data that has entered from the latch (a) 136. A multiplier (b) 139 multiplies the data from the latch (a) 136 and sends the product back to the latch (a) 136.

A latch (b) 137 latches the output of the selector (b) 134 and the output of the multiplier (c) 140. The latch (b) 137 is initialized by the signal Ls. A multiplier (c) 140 multiplies the data from the latch (b) 137 and sends the product back to the latch (b) 137. The output unit 141 outputs the aforementioned arithmetic-code data Cn from the data provided by the latch (b) 137.

FIGS. 10 and 11 illustrate an example in which the predicting unit of this embodiment is realized by hardware. An example in which the predicting unit of this embodiment is implemented by software will be described next.

Figure 12:
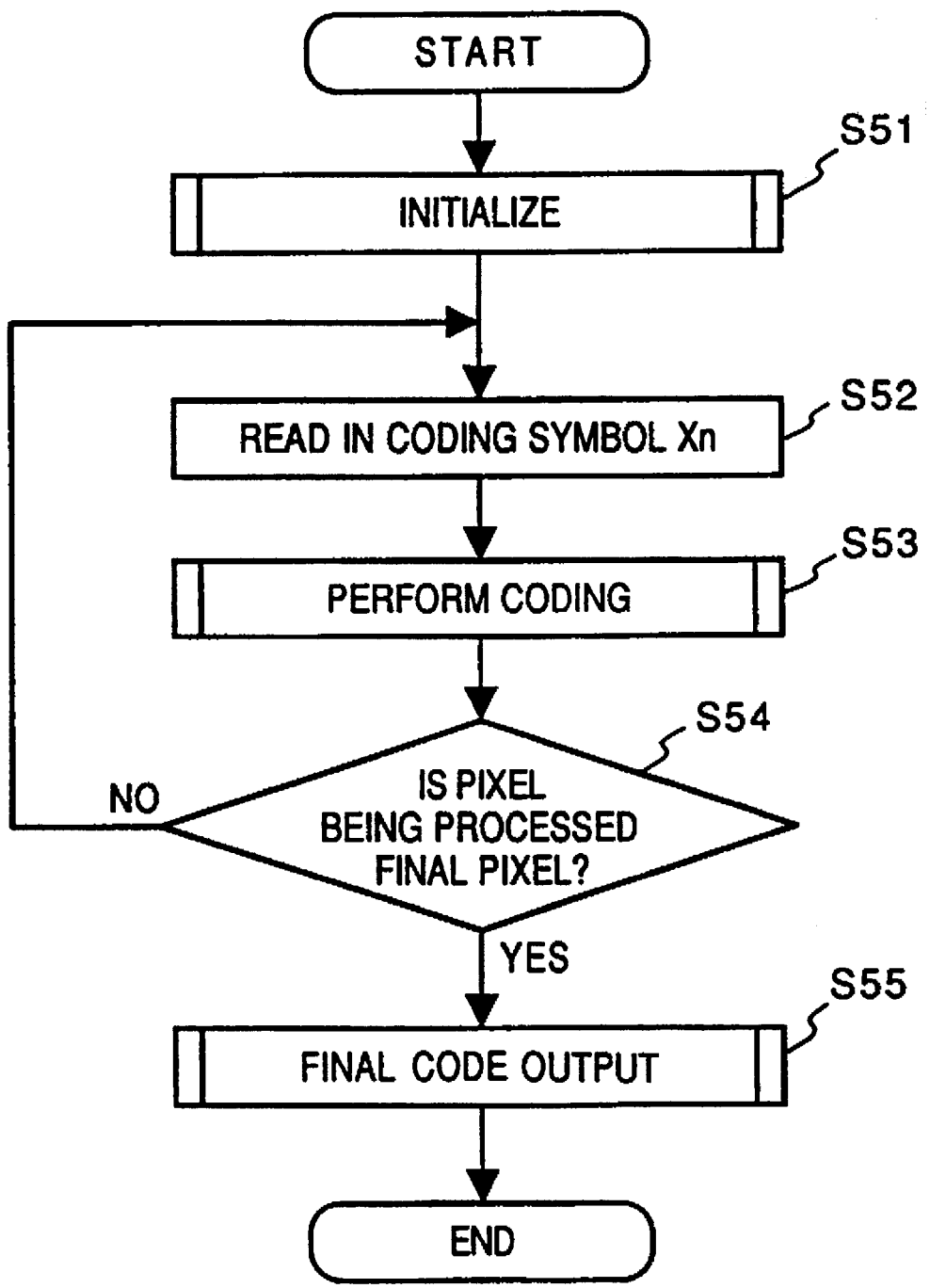
FIG. 12 is a flowchart illustrating the main routine of coding according to the first embodiment.

FIG. 12 is a flowchart illustrating the main routine of coding.

According to this embodiment as shown in FIG. 12, an "INITIALIZING" routine (described below) for initially setting the coder is executed at step S51, the coding symbol Xn is read in at step S52, a "CODING" subroutine, described below, is executed at step S53, and it is determined at step S54 whether the pixel undergoing processing is the final pixel. Processing proceeds to step S52 if this pixel is not the final pixel or to step S55 if this pixel is the final pixel. A "FINAL CODE OUTPUT" subroutine, described below, is executed at step S55, after which the main routine is concluded.

Figure 13:
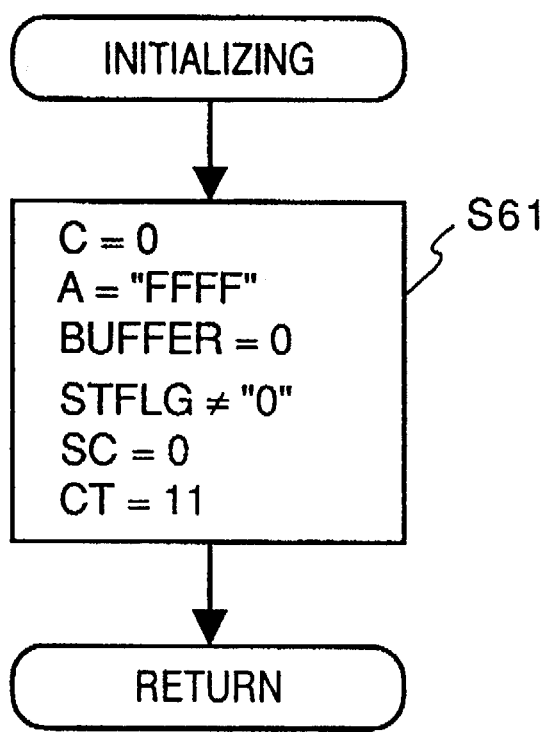
FIG. 13 is a flowchart illustrating the details of an "INITIALIZING" subroutine shown in FIG. 12.

FIG. 13 is a flowchart illustrating the "INITIALIZING" subroutine.

According to this embodiment as shown in FIG. 13, initial settings register C=0, BUFFER=0, COUNTER SC =0, register A="FFFF", flag STFLG≠0 and counter CT =11 are made at step S61, after which the "INITIALIZING" subroutine is terminated so that processing returns to the main routine.

Figure 14:
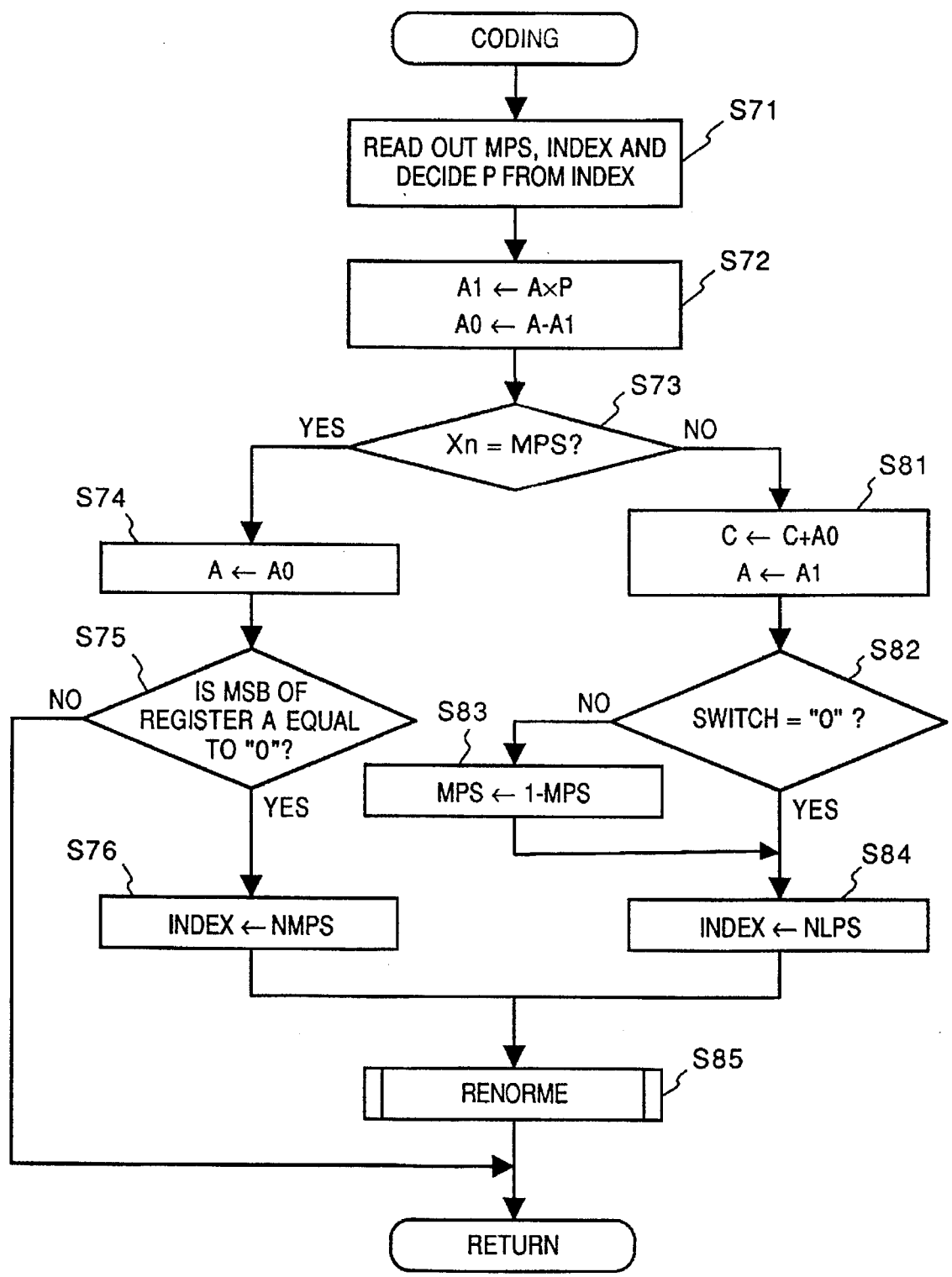
FIG. 14 is a flowchart illustrating the details of a "CODING" subroutine shown in FIG. 12.

FIG. 14 is a flowchart illustrating the "CODING" subroutine.

According to this embodiment as shown in FIG. 14, step S71 calls for the above-mentioned superiority symbol MPS and index INDEX to be read out of the LUT (a) 122 shown in FIG. 10 and for the inferiority symbol P to be decided from the index INDEX read. Step S72 calls for updating (A1←A×P) of a register A1 and updating (A0←A−A1) of a register A0. Next, Xn and MPS are compared at step S73 and processing proceeds to step S74 if Xn=MPS holds (i.e., if agreement with the prediction is achieved) or to step S81 if Xn≠MPS holds (i.e., if the prediction fails).

If agreement with the prediction is achieved (Xn=MPS), the register A is updated (A←A0) at step S74 and the most significant bit (hereinafter referred to as "MSB") of register A is discriminated at step S75. Processing proceeds to step S76 if MSB="0" holds. If MSB="1" holds, the "CODING" subroutine is concluded and processing returns to the main routine.

If MSB="0" holds, INDEX is updated at step S76 in accordance with an NMPS table, after which processing proceeds to step S85.

If the prediction fails (Xn≠MPS), a register C (C←C+A0) is updated and the register A is updated (A←A1) at step S81, and a switch SWITCH, which corresponds to INDEX, is discriminated at step S82. If SWITCH="0" holds, processing proceeds to step S84. If SWITCH="1" holds, processing proceeds to step S83, where MPS is inverted (MPS←1− MPS). Processing then proceeds to step S84.

Next, INDEX is updated at step S84 in accordance with an NLPS table, after which processing proceeds to step S85. A "RENORME" subroutine for renormalizing processing is executed at step S85, after which the "CODING" subroutine is terminated and processing returns to the main routine.

Figure 15:
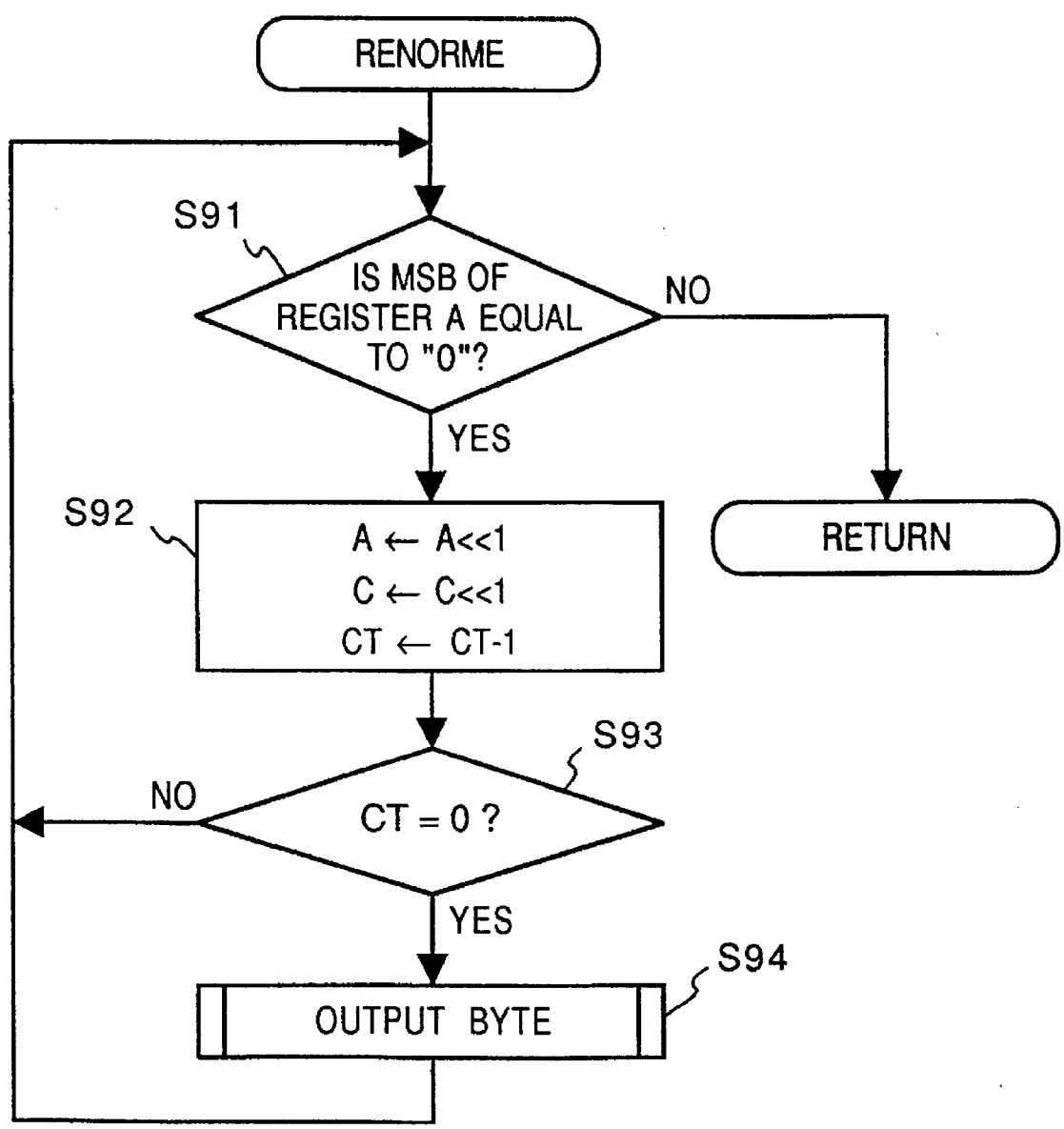
FIG. 15 is a flowchart illustrating the details of a "RENORME" subroutine shown in FIG. 14.

FIG. 15 is a flowchart illustrating the "RENORME" subroutine.

As shown in FIG. 15, the MSB of register A is discriminated at step S91. Processing proceeds to step S92 if MSB="0" holds and the "RENORME" subroutine is terminated if MSB="1" holds, after which processing returns to the "CODING" subroutine.

If MSB="0" is found to hold, then, at step S92, the registers A and C are shifted to the left (A←A<<1, C←C<<1) to perform updating and the counter CT is decremented (CT←CT−1) to perform updating. Then, at step S93, the value in the counter CT is discriminated. Processing proceeds to step S94 if CT=0 holds and returns to step S91 if CT≠0 holds.

If CT=0 holds, a OUTPUT BYTE subroutine is executed at step S94, after which processing returns to step S91. Thus, by virtue of the "RENORME" subroutine according to this embodiment, the registers A and C are shifted to the left and the counter CT is decremented until the MSB of register A becomes "1".

Figure 16:
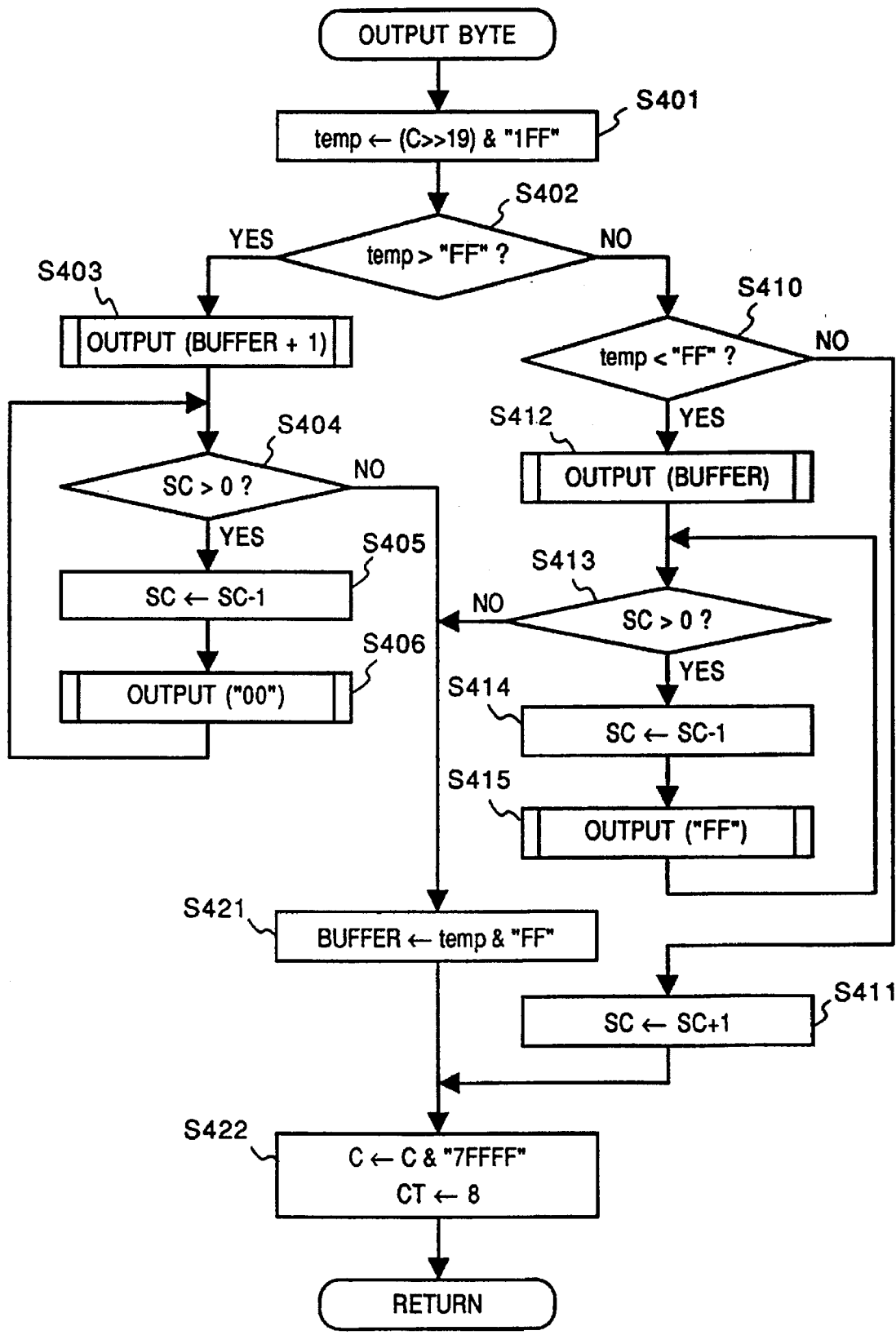
FIG. 16 is a flowchart illustrating the details of a OUTPUT BYTE subroutine shown in FIG. 15.

FIG. 16 is a flowchart illustrating the OUTPUT BYTE subroutine.

According to this embodiment as shown in FIG. 16, the logical product between a value (C>>19), which is obtained by shifting the value of register C 19 bits to the right, and "1FF" is stored in a register temp [temp ←(C>>19) & "1FF"] at step S401. In other words, the register temp stores the nine bits from bit 19 to bit 27 of the register C.

Next, the value in the register temp is discriminated at step S402. Processing proceeds to step S403 if temp>"FF" holds and to step S410 if temp≦"FF" holds.

If carry of bit 27 has been set (i.e., if temp>"FF" holds), a value obtained by adding 1 to a buffer BUFFER is adopted as an argument and an "OUTPUT" subroutine is executed at step S403. The value of the counter SC is discriminated at step S404. Processing proceeds to step S405 if SC>0 holds and to step S421 if SC=0 holds.

If SC>0 holds, the counter SC is decremented at step S405, "00" is adopted as an argument and an "OUTPUT" subroutine is executed at step S406, after which processing returns to step S404. Thus, in this embodiment, if carry of bit 27 has been set (temp>"FF"), the processing of steps S404 to S406 is executed until the count in counter SC attains the value 0.

If carry of bit 27 has not been set (i.e., if temp ≦"FF" holds), the register temp is discriminated again at step S410. Processing proceeds to step S412 if temp<"FF" holds and the counter SC is incremented at step S411 if temp="FF" holds, after which processing proceeds to step S422.

If temp<"FF" holds, the value in the buffer BUFFER is adopted as an argument and the "OUTPUT" subroutine is executed at step S412. The value in the counter SC is then discriminated at step S413. Processing proceeds to step S414 if SC>0 holds and to step S421 if SC=0 holds.

If SC>0 holds, the counter SC is decremented at step S414, "FF" is adopted as an argument and the "OUTPUT" subroutine is executed at step S415, after which returns to step S413. Thus, in this embodiment, if temp<"FF", the processing of steps S413 to S415 is repeated until the counter SC attains a value of 0.

Next, at step S421, the result of taking the AND between the value of the register temp and "FF" is stored in the buffer BUFFER (BUFFER←temp & "FF"). Namely, the buffer BUFFER stores the lower 8 bits of the register temp.

Next, at step S422, the result of taking the AND between the value of the counter C and "7FFFF" is stored in the register C (C←C & "7FFFF"), whereby the outputted 19 bits of the register C are cleared and counter CT=8 is established, after which the OUTPUT BYTE subroutine is terminated and processing returns to the main routine.

Figure 17:
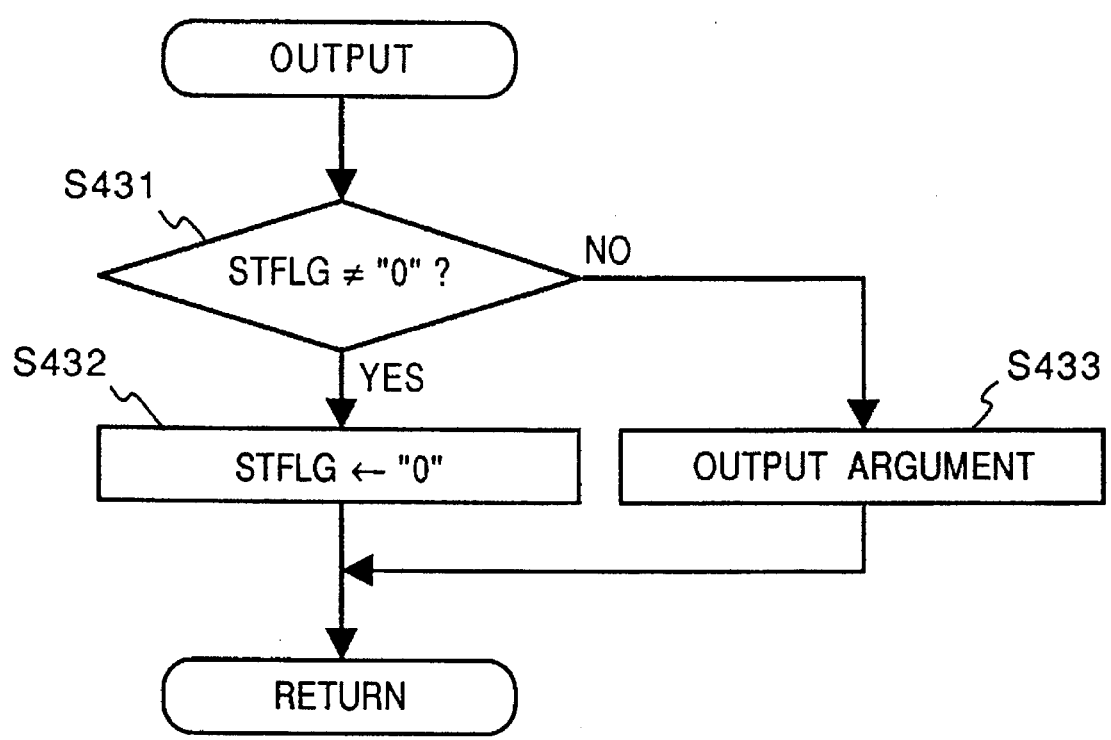
FIG. 17 is a flowchart illustrating the details of an "OUTPUT" subroutine shown in FIG. 16.

FIG. 17 is a flowchart illustrating the "OUTPUT" subroutine.

According to this embodiment as shown in FIG. 17, the flag STFLG is discriminated at step S431. If STFLG ="0" holds, data given as an argument is outputted at step S433, after which the "OUTPUT" subroutine is concluded and processing returns to the "BYTE OUTPUT" subroutine.

If STFLG≠0 holds, then STFLG is made "0" at step S432, after which the "OUTPUT" subroutine is concluded and processing returns to the OUTPUT BYTE subroutine. More specifically, since the initial value of the register C enters as an argument in the first cycle of "OUTPUT" processing, step S431 is executed in order to nullify this. Data provided as an argument is outputted from the second cycle of "OUTPUT" processing onward.

Figure 18:
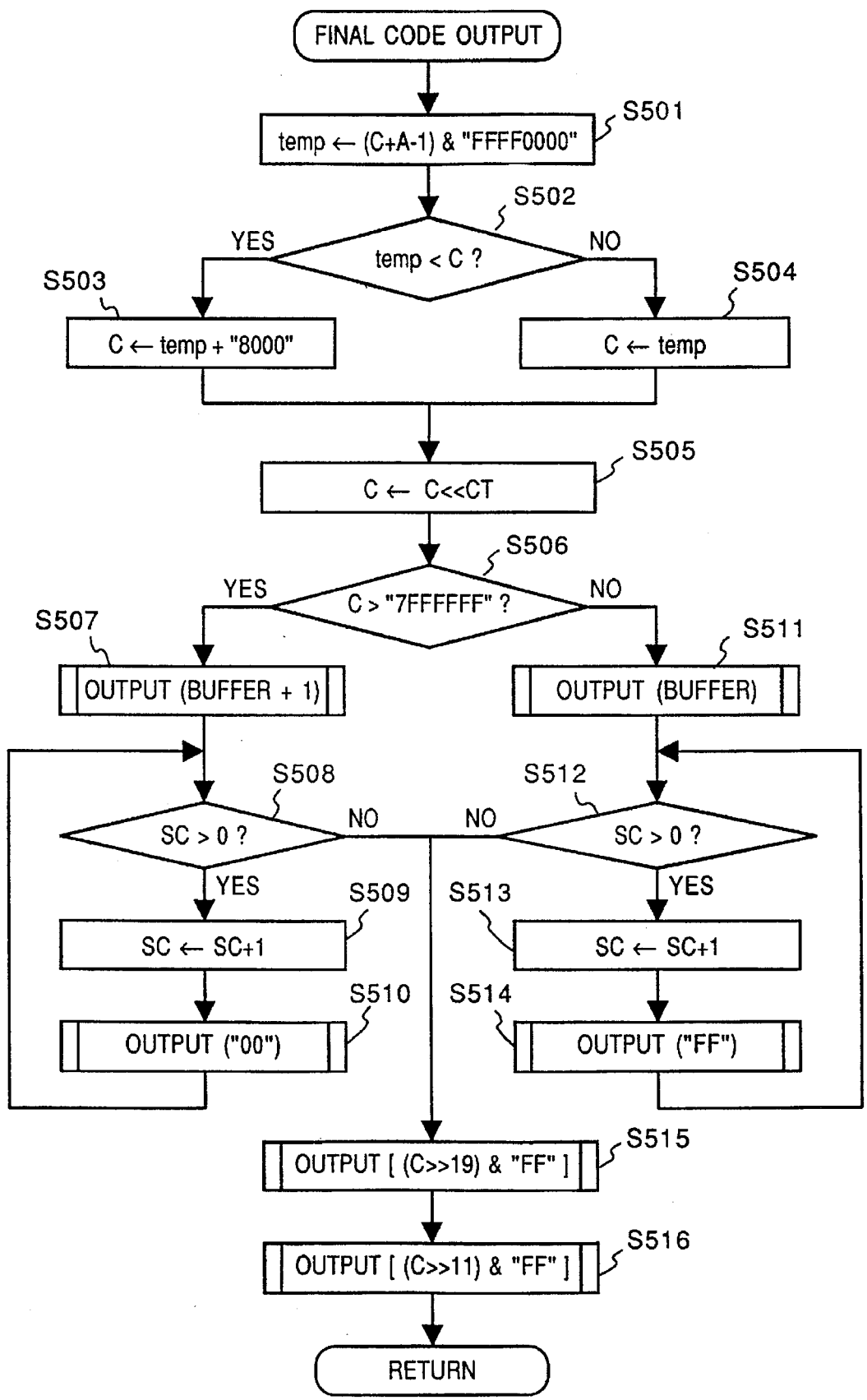
FIG. 18 is a flowchart illustrating the details of a "FINAL CODE OUTPUT" subroutine shown in FIG. 12.

FIG. 18 is a flowchart illustrating the "FINAL CODE OUTPUT" subroutine. This flowchart illustrates processing for performing final output of a code remaining in the register C.

According to this embodiment as shown in FIG. 18, the result of taking the AND between the calculation (C+A−1) and "FFFF0000" is stored in the register temp [temp←(C+A−1) & "FFFF0000"] at step S501. That is, the register temp stores the 16 higher order bits of the calculation (C+A−1).

Next, the values in register temp and register C are compared at step S502. If temp<C holds, the register C is updated (C←temp+"8000") at step S503. If temp≧C holds, then the register C is updated (C←temp) at step S504.

Next, at step S505, the register C is shifted to the left (C←C<<CT) by the value in the counter CT, and then the value in the counter C is discriminated at step S506. Processing proceeds to step S507 if C>"7FFFFFF" holds and to step S511 if C≦"7FFFFFF" holds.

If C>"7FFFFFF" holds, a value obtained by adding 1 to the buffer BUFFER is adopted as an argument and the "OUTPUT" subroutine shown in FIG. 17 is executed at step S507. The value in the counter SC is discriminated at step S508. Processing proceeds to step S509 if SC>0 holds and to step S515 if SC=0 holds.

If SC>0 holds, the counter SC is decremented at step S509 and the "OUTPUT" subroutine is executed at step S510 with "00" serving as the argument. Processing then returns to step S508. Thus, in this embodiment, if C>"7FFFFFF" holds, the processing of steps S508 to S510 is repeated until the counter SC attains a value of 0.

If C≦"7FFFFFF" holds, the value in the buffer BUFFER is adopted as an argument and the "OUTPUT" subroutine shown in FIG. 17 is executed at step S511. The value in the counter SC is discriminated at step S512. Processing proceeds to step S513 if SC>0 holds and to step S515 if SC=0 holds.

If SC>0 holds, the counter SC is decremented at step S513 and the "OUTPUT" subroutine is executed at step S514 with "FF" serving as the argument. Processing then returns to step S512. Thus, in this embodiment, if C≦"7FFFFFF" holds, the processing of steps S512 to S514 is repeated until the counter SC attains a value of 0.

Next, at step S515, the "OUTPUT" subroutine is executed with the eight bits from bit 19 to bit 26 of the register C serving as the argument [(C>>19) & "FF"]. Next, at step S516, the "OUTPUT" subroutine is executed with the eight bits from bit 11 to bit 18 of the register C serving as the argument [(C>>11) & "FF"].

In the description given above, an example is described in which reduced pixels and pixels which are the subject of coding are compared in color and it is determined whether TP is possible or not. However, it goes without saying that the reduced pixels and pixels which are the subject of coding may be compared in density.

Thus, the TP flag and whether or not TP is possible can be decided merely by referring to pixels which are the subject of coding and reduced pixels a single time by means of TP-flag detection, TP judgment and a two-line delay. As a result, hierarchical coding can be realized by a small amount of hardware.

(Second Embodiment)

In a second embodiment of the invention, binary image data is subjected to hierarchical coding by 25 deterministic prediction DP in the hierarchical coder shown in FIG. 1.

Figure 19:
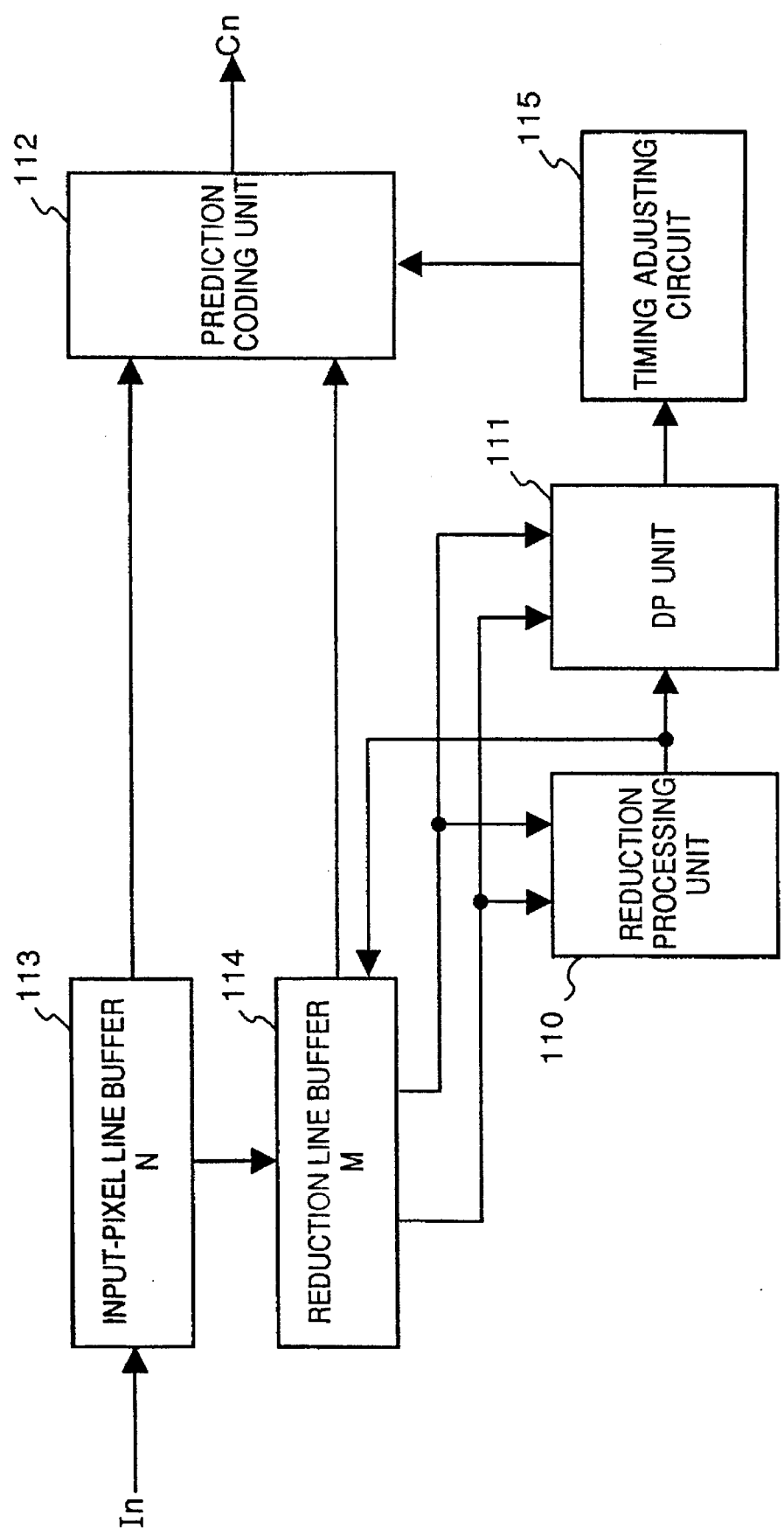
FIG. 19 is a block diagram illustrating the details of a coder according to a second embodiment of the invention.

FIG. 19 is a block diagram illustrating the detailed configuration of a coder according to a second embodiment of the invention. The coder illustrated in FIG. 19 is adapted to perform DP continuously without a frame memory for storing a reduced image.

As shown in FIG. 19, the coder includes a reduction processor 110, a DP unit 111, a prediction coding unit 112, an input-pixel line buffer (N) 113, a reduction line buffer (M) 114 and a timing adjusting circuit 115.

Input image data $I_n$ enters the input-pixel line buffer (N) 113, and a reference pixel outputted by the input-pixel line buffer (N) 113 enters the prediction coding unit 112 and reduction line buffer (M) 114. To this end, the input-pixel line buffer (N) 113 stores also the peripheral pixels of the coded image data In.

The results of reduction performed by the reduction processor 110 are stored in the reduction line buffer (M) 114. To this end, a number of lines of reduced-pixel data $I_{(n+1)}$ are stored in the reduction line buffer (M) 114. The reduction line buffer (M) 114 outputs the reference-pixel data to the reduction processor 110, the DP unit 111 and the prediction coding unit 112.

Figure 20:
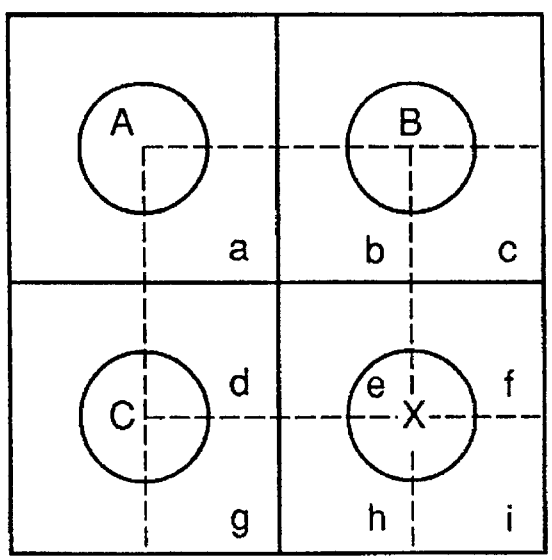
FIG. 20 is a diagram for describing reduction processing in a reduction processing unit shown in FIG. 19.

FIG. 20 is a diagram for describing reduction processing in the reduction processor 110.

In FIG. 20, pixels a, b, c, d, e, f, g, h, i indicated by the small squares represent high-resolution pixels, and pixels A, B, C indicated by the circles represent pixels already reduced. A pixel X represents a pixel whose on/off state (i.e., pixel value "1" or "0") is to be decided by reduction processing.

The compressor processor 110 refers to the peripheral reduced pixels as well as the high-resolution pixels and decides the on/off state of the pixel X. More specifically, in order to prevent fine lines from disappearing owing to reduction processing, and in consideration of preserving density, a rule decided so as to maintain the quality of the reduced image is stored in a look-up table in advance. The on/off state of the pixel X is decided upon referring to this look-up table.

Figure 21:
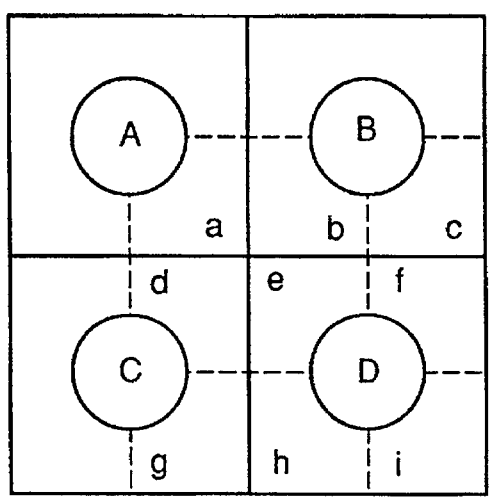
FIG. 21 is a diagram for describing DP in a DP unit.

FIG. 21 is a diagram for describing DP in the DP unit 111.

As shown in FIG. 21, pixels a, b, c, d, e, f, g, h, i indicated by the small squares represent high-resolution pixels, and pixels A, B, C, D indicated by the circles represent pixels already subjected to reduction processing by the reduction processor 110. The pixel D corresponds to the pixel X, shown in FIG. 20, for which the on/off status has been decided in the reduction processor 110.

The DP value indicates, by a single bit, whether DP is possible or not. If DP is possible, the pixel for which DP is possible is excluded from coding.

The DP value of pixel e is decided by pixels A, B, C, D and pixels a~d, the DP value of pixel f by pixels A, B, C, D and pixels a~e, the DP value of pixel h by pixels A, B, C, D and pixels a~g, and the DP value of pixel i by pixels A, B, C, D and pixels a~h.

On the decoding side, whether a pixel for which DP is possible is white or black is indicated by a single bit, and the result is made decoded pixel data.

Processing for reducing an input image and deciding DP values in the embodiment having the foregoing construction will now be described with reference to the flowchart shown in FIG. 22.

Figure 22:
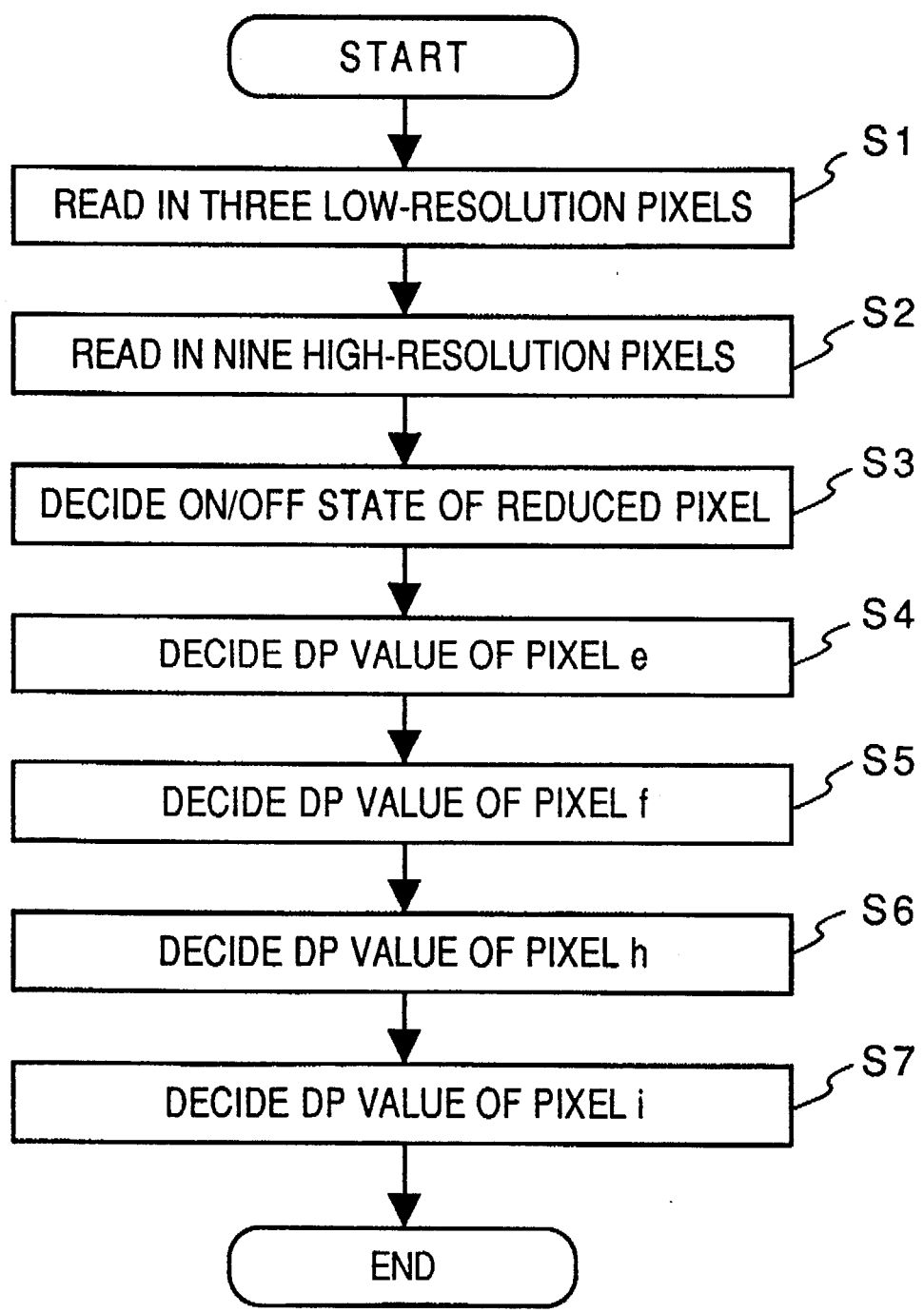
FIG. 22 is a flowchart illustrating processing for reducing an input image and deciding DP values in the second embodiment.
Figure 23:
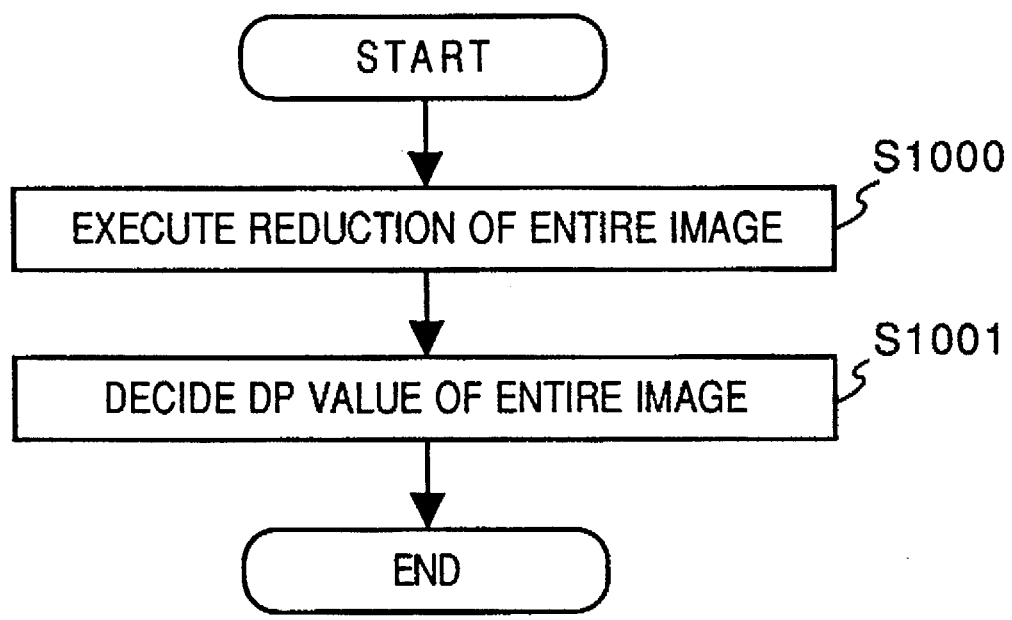
FIG. 23 is a flowchart illustrating the procedure of ordinary DP processing.

As shown in FIG. 22, the reduction processor 110 reads in three low-resolution pixels (pixels A, B, C in FIG. 20), which have already been subjected to reduction processing, at step S1. It is assumed that all of these pixels are white at the beginning of processing.

Next, nine high-resolution pixels (pixels a~i in FIG. 20) are read in at step S2. Similarly, it is assumed that all of these pixels are white at the beginning of processing.

This is followed by step S3, at which the on/off status of one reduced pixel (pixel X in FIG. 20) is decided from the above-mentioned 3+9=12 pixels.

The DP unit 111 decides the DP values of the pixels e, f, h, i at step S4~S7. That is, the DP value of pixel e is decided at step S4, the DP value of pixel f at step S5, the DP value of pixel h at step S6, and the DP value of pixel i at step S7.

When processing ends, coding processing is executed by the prediction coding unit 112. The construction of this unit is the same as that of the first embodiment shown in FIG. 10, and the processing is the same as the coding processing of the first embodiment illustrated in FIGS. 12 through 18. Accordingly, the construction and processing need not be described again.

Thus, in subsequent processing in which the on/off status of one reduced pixel is decided by reduction processing, information for judging whether DP is possible or not using the results of reduction is outputted with regard to a plurality of pixels, thereby eliminating the need for a frame memory to store the reduced image. This makes it possible to raise processing speed and reduce the amount of hardware.

In third through 11th embodiments described below, unit for entering, in parallel, a plurality of items of image data delayed one line at a time in a sub-scan direction, and delay unit for applying a delay in a main-scan direction are provided, whereby unit for raising coding efficiency or unit for performing a resolution transformation can be operated in parallel with the coder. This makes possible synchronous coding on a real-time basis.

(Third Embodiment)

Figure 24:
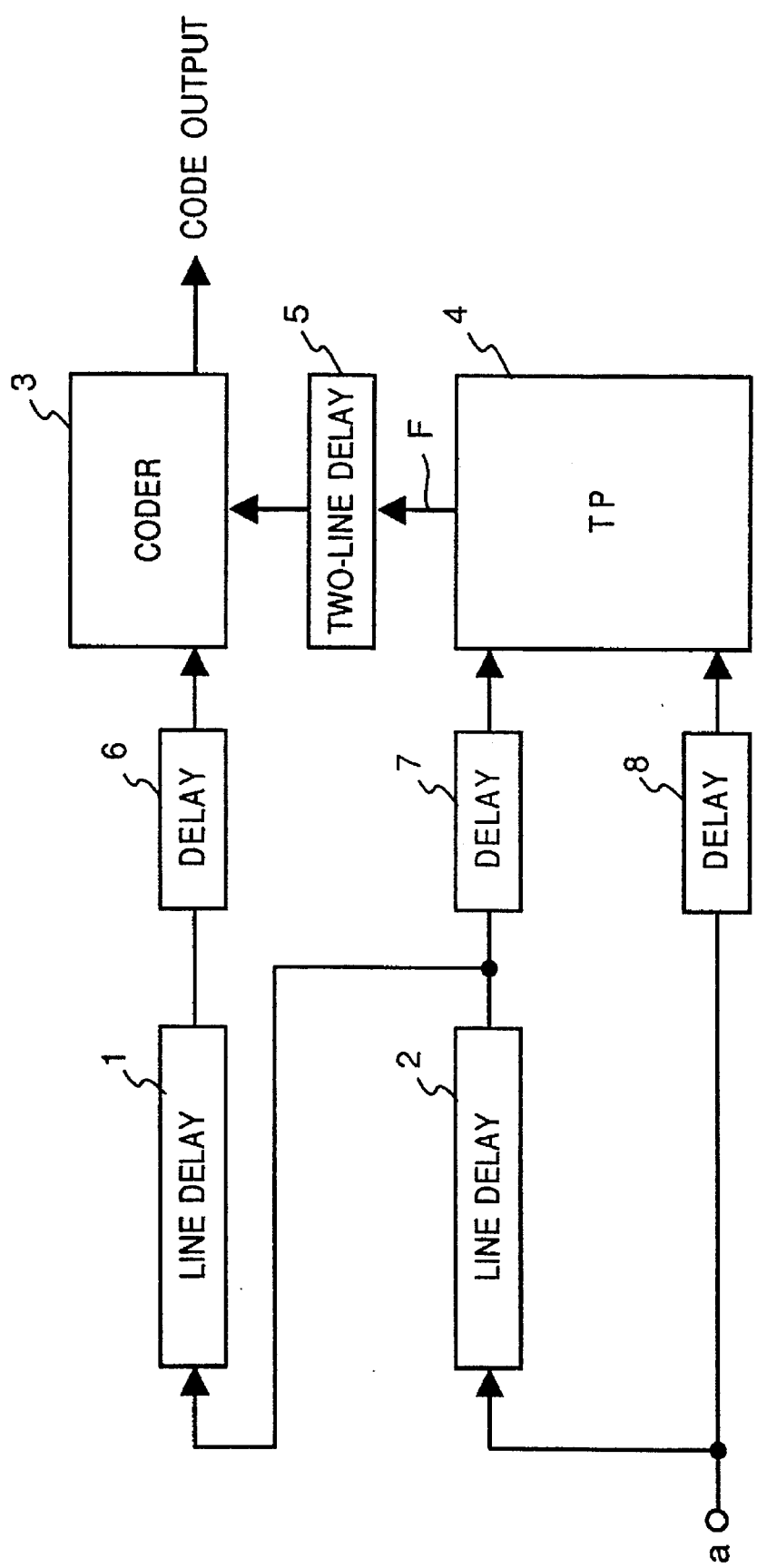
FIG. 24 is a block diagram illustrating configuration of a coding apparatus according to a third embodiment of the present invention.

FIG. 24 is a block diagram illustrating the configuration of a coding apparatus according to a third embodiment of the present invention.

As shown in FIG. 24, binary image data enters a terminal a. Line delays 1, 2 delay one line of data in the sub- and main-scan directions, respectively, and delays 6, 7 and 8 each delay image data in the main-scan direction. A block 4 performs TP processing, a two-line delay 5 delays the output of the TP block 4 by two lines in the sub-scan direction, and a coder 3 performs coding based upon the outputs of the delay 6 and two-line delay 5.

The operation of the apparatus shown in FIG. 24 will be described in detail with reference to FIG. 24. In the description that follows, it is assumed that the amount of delay in the delays 6~8 is zero in the main-scan direction.

The binary image data enters the TP 4 and the line delay 2. Assume that the image data currently entering the terminal a is data of the (n−1)th line. Next, when image data of the n-th line begins entering the terminal a, the output of the line delay 2 becomes image data of the (n−1)th line delayed by one line. Using the image data of the n-th and (n−1)th lines, the TP 4 determines whether the image data of the n-th line is capable of being predicted and outputs Fn, which is the result of the determination made.

When image data of the (n+2)th line begins entering the terminal a, image data of the (n+1)th line begins being outputted by the line delay 2 and image data of the n-th line begins being outputted by the line delay 1. The coder 3 is capable of discriminating the content of the output Fn of TP 4, which has been delayed by the two-line delay 5, before it codes the image of the n-th line. Accordingly, the coder 3 sequentially codes the image data of the n-th line if prediction is not possible and but does not code the image data of the n-th line is prediction is possible.

If the foregoing processing is sequentially executed over all lines, the means for raising coding efficiency and the coder can be operated at the same time. This makes it possible to execute real-time synchronous coding.

(Fourth Embodiment)

Figure 25:
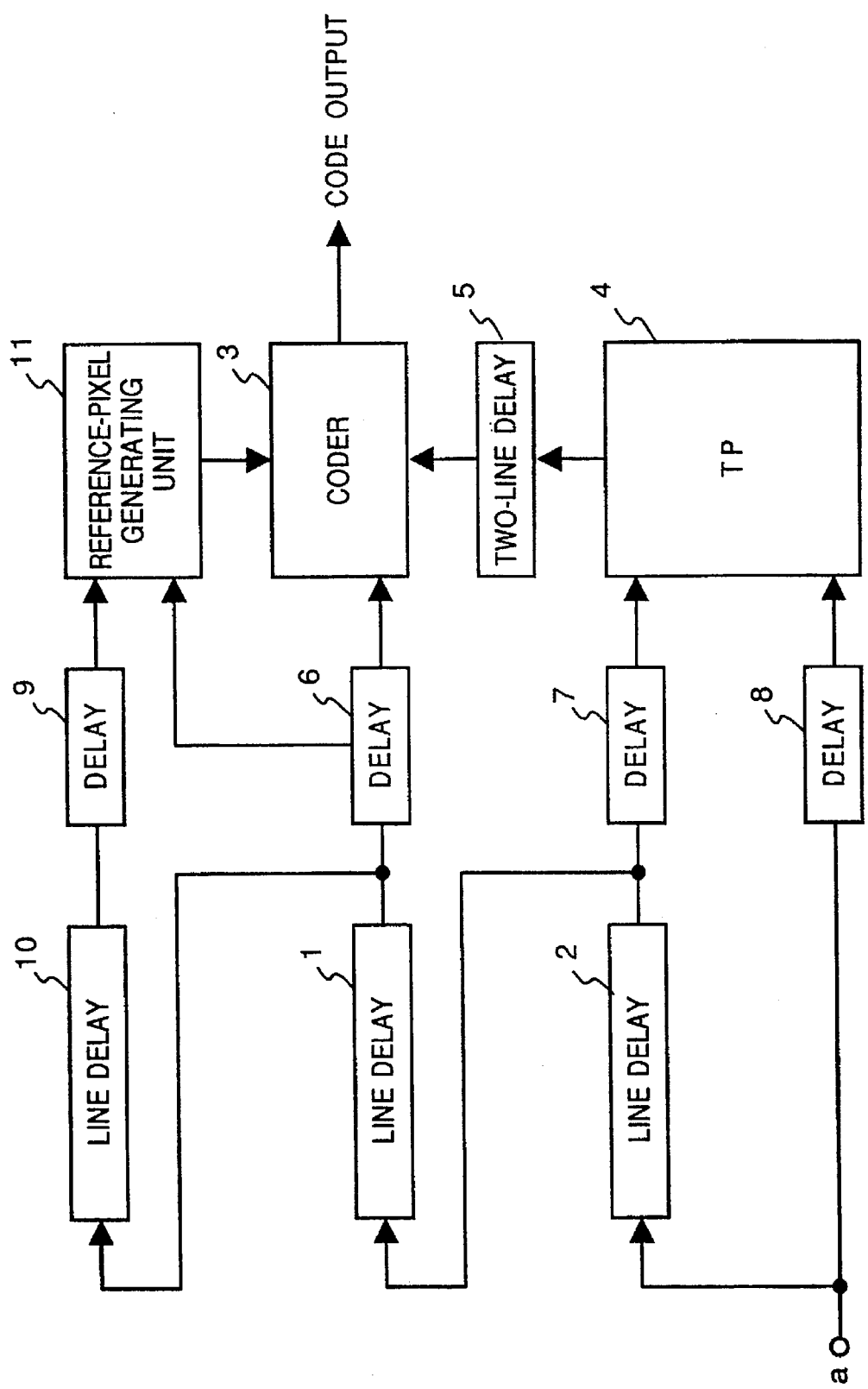
FIG. 25 is a block diagram illustrating the configuration of a coding apparatus according to a fourth embodiment of the present invention.

FIG. 25 is a block diagram illustrating the configuration of a coding apparatus according to a fourth embodiment of the present invention. Portions identical with those shown in FIG. 24 are designated by like reference numerals and need not be described again in detail.

As shown in FIG. 25, numeral 10 denotes a line delay for delaying one line of data in the sub-scan direction, 9 a delay for delaying image data in the main-scan direction, and 11 a reference-pixel generating unit for generating a reference pixel used as a prediction model in the coder 3.

The operation of the apparatus shown in FIG. 25 will now be described. In the description that follows, let the amount of delay in the delays 7, 8 in the main-scan direction be zero, and assume that the total amount of delay in the delays 6, 9 in the main-scan direction is decided by the number of pixels that the reference-pixel generating unit 11 needs to form a reference pixel and by the operation timing of the coder 3.

The delayed outputs of the delays 6, 9 in pixel units enter the reference-pixel generating unit 11, which outputs a reference pixel for raising the coding efficiency of the coder 3. The TP 4 and coder 3 operate in parallel through a procedure the same as that of the third embodiment.

This embodiment differs from that of the third embodiment in that when image data of the n-th line is coded, a reference pixel can be generated in synchronism with the coding operation.

(Fifth Embodiment)

Figure 26:
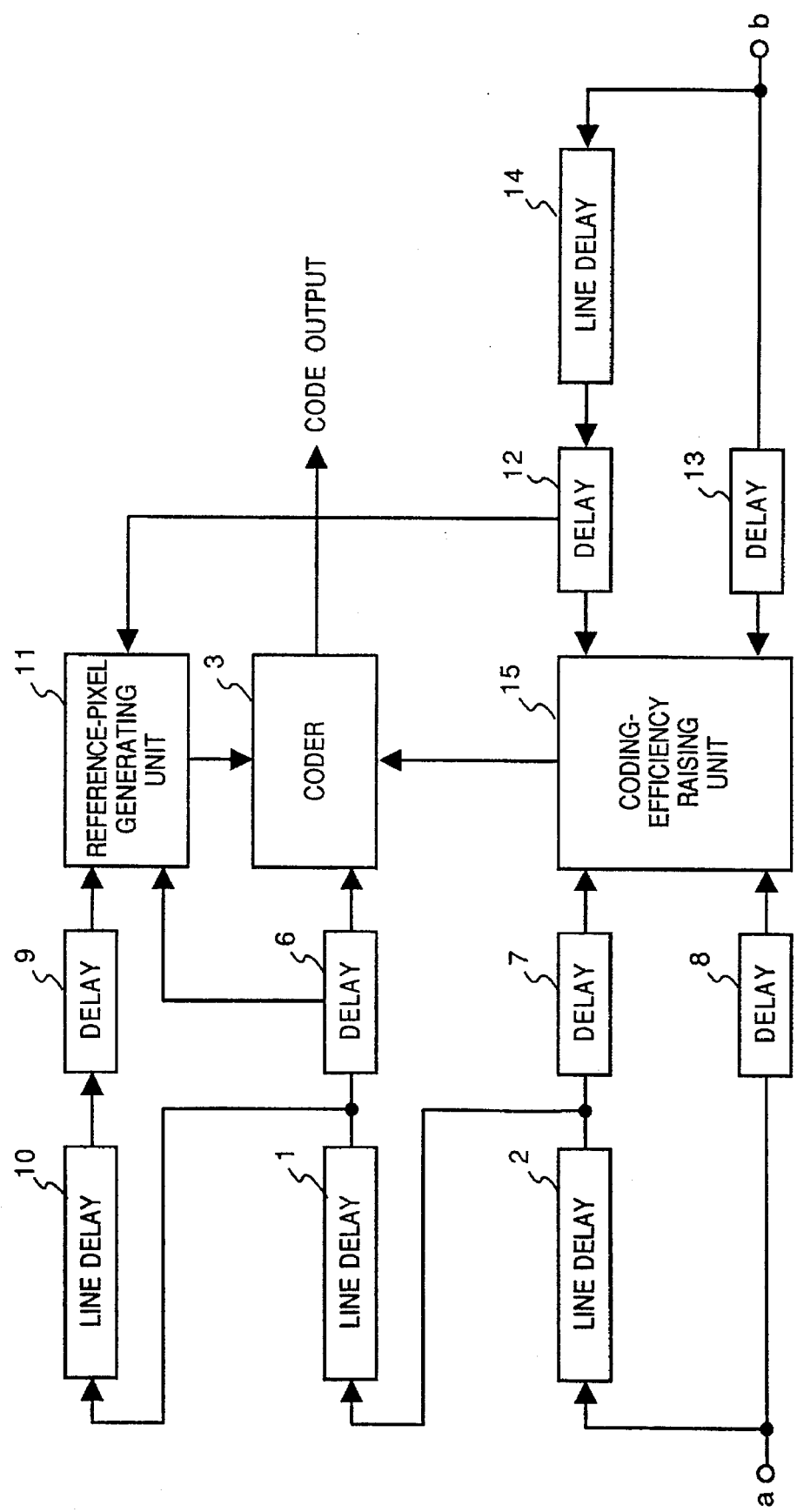
FIG. 26 is a block diagram illustrating the configuration of a coding apparatus according to a fifth embodiment of the present invention.

FIG. 26 is a block diagram illustrating the configuration of a coding apparatus according to a fifth embodiment of the present invention. Portions identical with those shown in FIGS. 24 and 25 are designated by like reference numerals and need not be described again in detail.

As shown in FIG. 26, reduced image data corresponding to the binary image that enters from the terminal a is applied to a terminal b, a line delay 14 delays one line of the data in the sub-scan direction, delays 12, 13 each delay image data in the main-scan direction, and a unit 15 raising the efficiency of coding.

This embodiment differs from that of the fourth embodiment in that the unit 15 for raising coding is operated using binary image data to be coded as well as the reduced image data thereof, and in that the reference-pixel generating unit 11 also uses the binary image data to be coded as well as the reduced image data thereof to generate the reference pixel at the same time.

(Sixth Embodiment)

Figure 27:
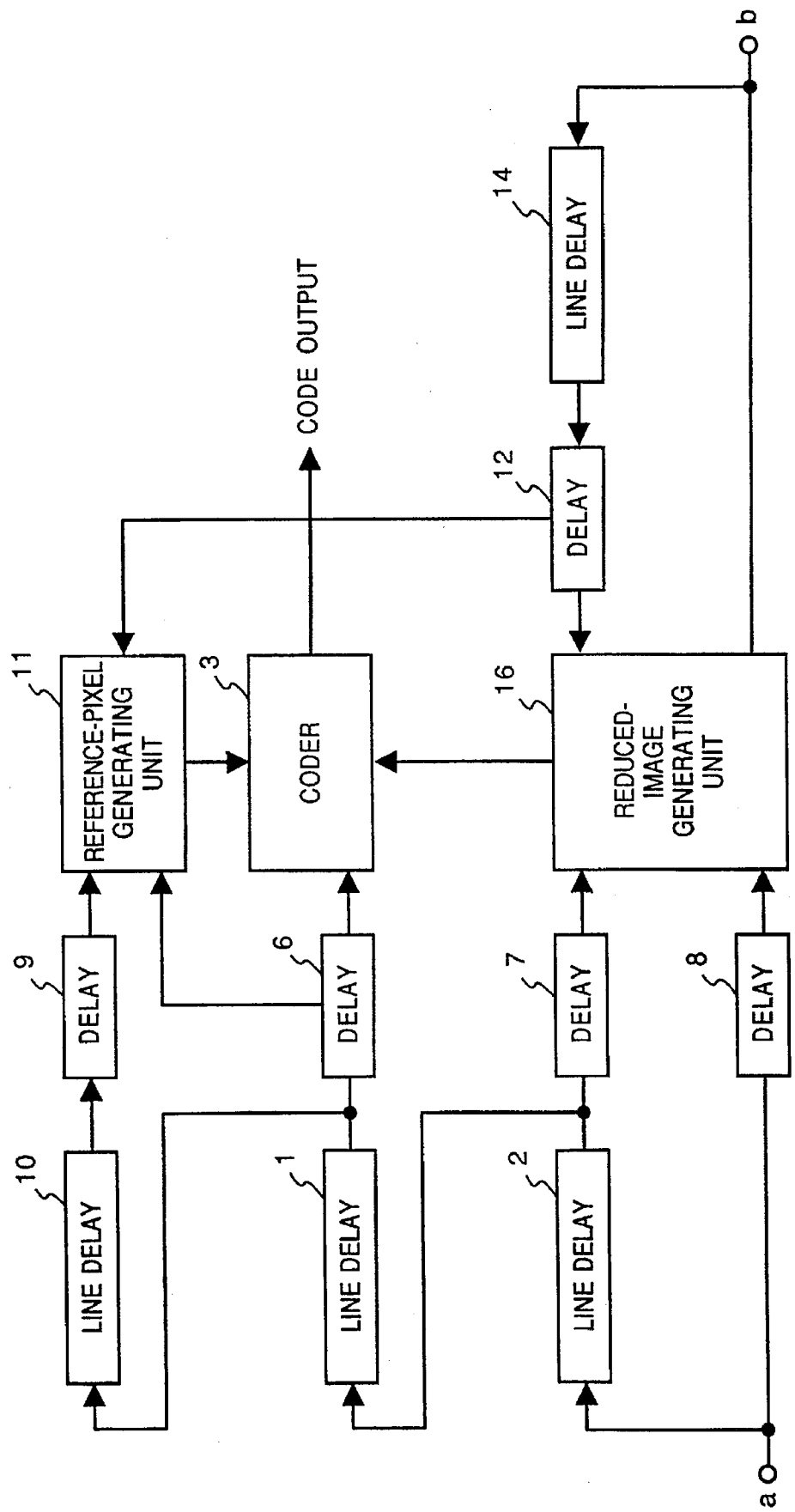
FIG. 27 is a block diagram illustrating the configuration of a coding apparatus according to a sixth embodiment of the present invention.

FIG. 27 is a block diagram illustrating the configuration of a coding apparatus according to a sixth embodiment of the present invention. Portions identical with those shown in FIGS. 24 and 25 are designated by like reference numerals and need not be described again in detail.

Numeral 16 in FIG. 27 denotes a reduced-image generating unit for generating reduced image data using image data to be coded as well as image data already reduced. By virtue of this arrangement, a reference pixel is generated and coding can be performed while the reduced image data is being generated.

(Seventh Embodiment)

Figure 28:
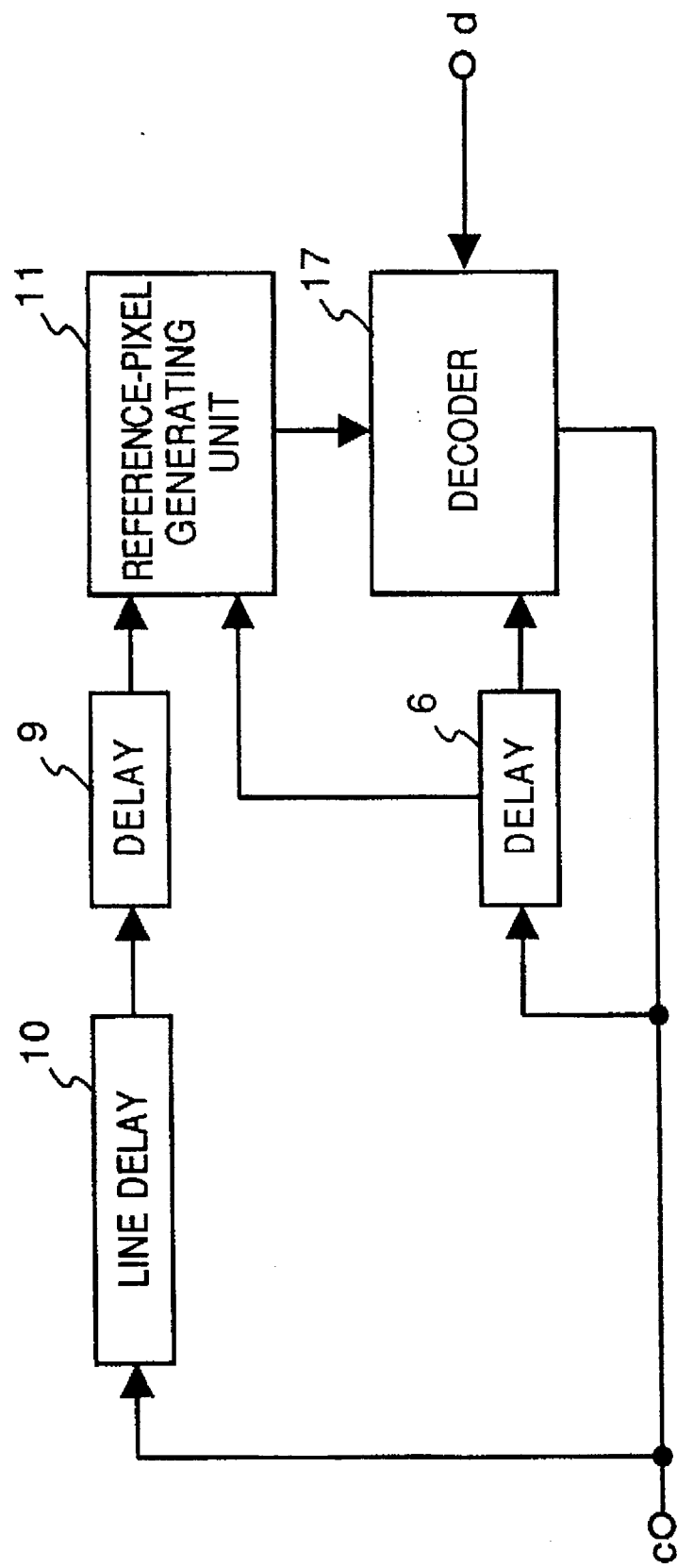
FIG. 28 is a block diagram illustrating the configuration of a decoding apparatus according to a seventh embodiment of the present invention.

FIG. 28 is a block diagram illustrating the configuration of a coding apparatus according to a seventh embodiment of the present invention. Portions identical with those shown in FIGS. 24 and 25 are designated by like reference numerals and need not be described again in detail.

The apparatus of FIG. 28 has a terminal c for outputting decoded image data, a terminal d for inputting code data, and a decoder 17.

The operation of the apparatus shown in FIG. 28 will be described below. The amount of delay in each of the delays 6, 9 in the main-scan direction is assumed to be enough for the reference-pixel generating unit 11 and decoder 17 to perform processing.

Code data inputted from the terminal d is decoded by the decoder 17, and the decoded data is delivered from terminal c. The decoded image data is delayed by the delay 6 and the delays 10, 9, a reference pixel is generated by the reference-pixel generating unit 11, and the reference pixel enters the decoder 17. Decoding is performed by repeating this processing.

This arrangement makes it possible to perform real-time synchronous decoding.

(Eighth Embodiment)

Figure 29B:
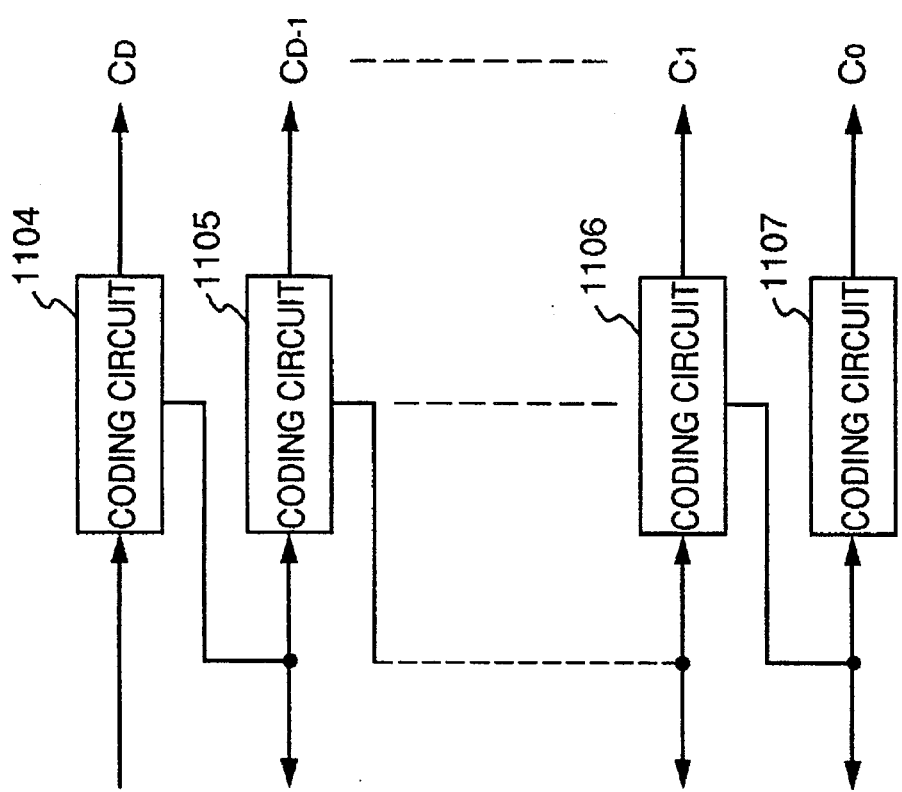
FIG. 29B is a block diagram illustrating the configuration of a coding apparatus according to an eighth embodiment of the present invention.
Figure 29A:
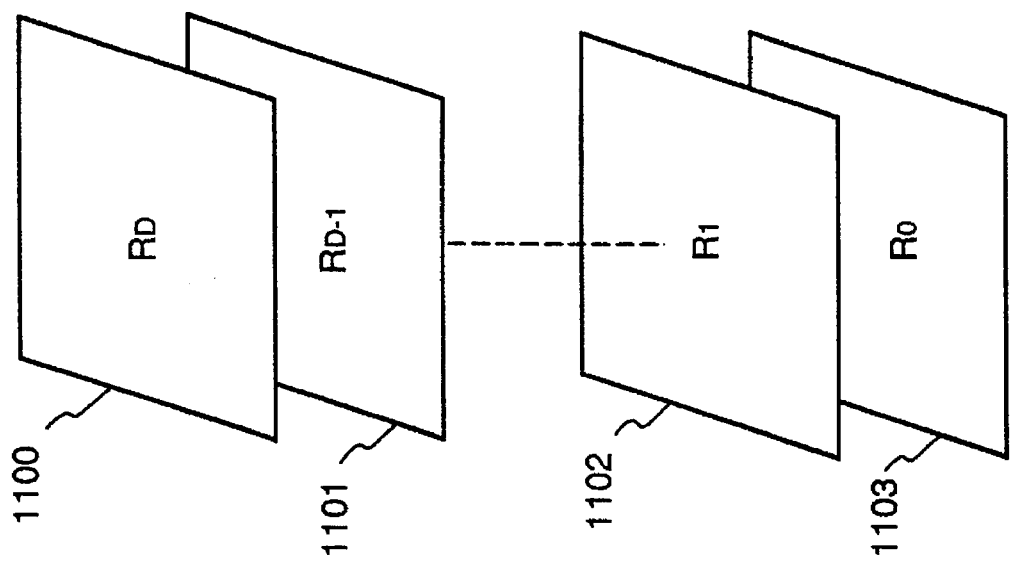
FIG. 29A is a diagram illustrating binary image data.

FIG. 29A is a diagram illustrating binary image data. Numerals 1100~1103 denote items of binary image data the resolutions of which are related as follows: $R_D > R_{D-1} > \ldots > R_1 > R_0$. FIG. 29B is a block diagram illustrating the construction of the eighth embodiment, in which numerals 1104~1107 denote coding circuits constructed according to the present invention, and $C_D \sim C_0$ represent hierarchical code data.

In order to simplify the description of the arrangement of this embodiment, a system will be discussed in which a reference pixel is generated and coding performed while a reduced image is generated. The coding circuits 1104~1106 each include an arrangement identical with that of FIG. 27, and the coding circuit 1107 has the construction of FIG. 25 or the construction of FIG. 25 minus the TP 4 for improving coding efficiency.

The operation of the apparatus shown in FIG. 29B will now be described. The coding circuit 1104 receives the image data $R_D$ as an input, outputs reduced image data $R_{D-1}$ and outputs the code $C_D$. The coding circuit 1105 receives the image data $R_{D-1}$, which has been generated by the coding circuit 1104, as an input, outputs reduced image data $R_{D-2}$ and outputs the code $C_{D-1}$. This operation is repeated up to the coding circuit 1106. The coding circuit 1107 outputs the code $C_0$ upon being provided with reduced image data $R_0$ generated by the coding circuit 1106.

By virtue of this arrangement, all of the hierarchical data can be generated on a real-time basis and synchronous coding can be performed. In addition, coding can be carried out without providing a memory device for storing the image data $R_D \sim R_0$. Furthermore, it goes without saying that if this arrangement is adopted for decoding as well, synchronous decoding can be performed.

(Ninth Embodiment)

FIG. 30A is a diagram illustrating binary image data. Numerals 1200~1203 denote items of binary image data each of which has at least one hierarchy or a plurality of hierarchies. Multivalued image data, which is typified by a color image or the like, is constructed by the data 1200~1203. Numerals 1204~1207 denote coding circuits which include the arrangement of FIG. 29B, and $C_{PD} \sim C_{P0}$ represent code outputs of bit planes $P_D \sim P_0$.

The coding circuits 1204~1207 are capable of synchronously coding the images of the bit planes $P_D \sim P_0$ in real time.

By virtue of this arrangement, it goes without saying that coded data can be synchronously decoded on a real-time basis to obtain multivalued image data.

(Tenth Embodiment)

Figure 31:
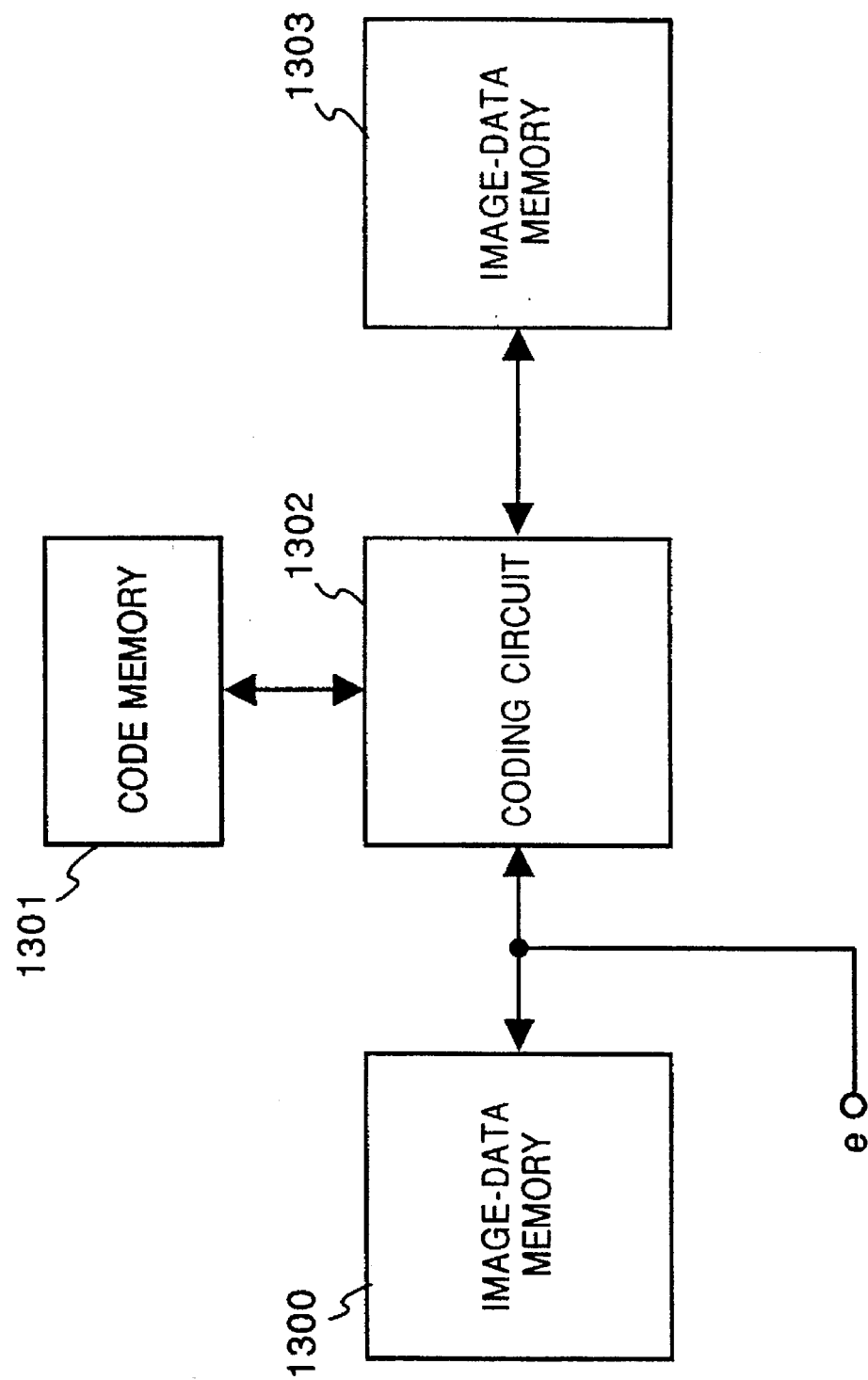
FIG. 31 is a block diagram illustrating the configuration of a coding apparatus according to a tenth embodiment of the present invention.

FIG. 31 is a block diagram illustrating the configuration of a tenth embodiment according to the present invention. Numerals 1300 and 1303 denote image-data memory units, 1302 a coding circuit constructed according to the present invention, and 1301 a code memory unit.

The operation of this arrangement will be described below. In order to simplify the description, it will be assumed that the coding circuit 1302 includes the arrangement illustrated in FIG. 27.

The coding circuit 1302 reads binary image data, which is the object of coding, out of the image-data memory unit 1300 sequentially, reduced image data is generated by the processing circuit of FIG. 27, and this data is written in the image-data memory unit 1303. At the same time, a reference pixel necessary for coding is generated and coding is performed, and the coded data is written in the code memory unit 1301. The coded data that has been written in the code memory unit 1301 is moved to another memory device or transferred to the decoding unit by the host system. It goes without saying that even if additional data processing is applied for attaching a data identifying header to the coded data in the course of this operation, processing would be the same.

When the coding of the image data in the image-data memory unit 1300 ends, the image data that has been stored in the image-data memory unit 1303 is made the object of coding. Reduced image data is stored in the image-data memory unit 1300, and the coded data is stored in the code memory unit 1301.

By repeating this processing, hierarchical coding can be performed synchronously on a real-time basis. Since the coding circuit 1302 is capable of synchronously coding the entered binary image data in real time, coding can be performed without the intervention of a memory device when an image of maximum resolution is coded. For example, if a binary image read by an image scanner or the like or a binary image generated by a computer or the like can be entered directly from the terminal e and coded and reduction processing included in the coding circuit 1302 is processing for reducing the resolution of the original image to one-half, then the quantity of image data stored by the code memory unit 1301 will be one-quarter that of the original image and 1/16 of the image-data memory unit 1300 will suffice.

(11th Embodiment)

Figure 32:
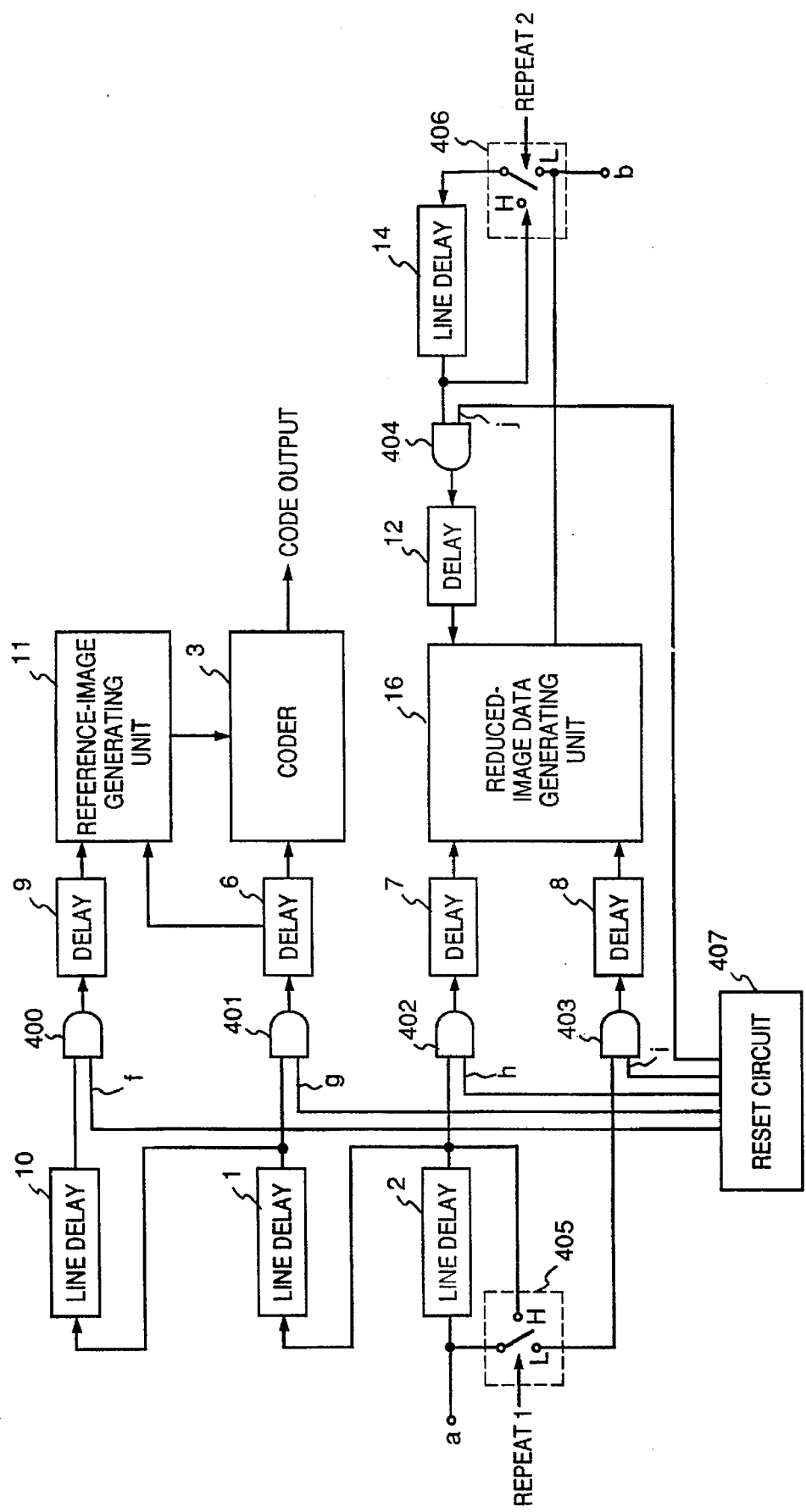
FIG. 32 is a block diagram illustrating the configuration of a coding apparatus according to an 11th embodiment of the present invention.

FIG. 32 is a block diagram illustrating the configuration of an 11th embodiment of the present invention. Portions identical with those shown in FIG. 27 are designated by like reference numerals and need not be described again in detail.

The apparatus shown in FIG. 32 includes multiplexers 405, 406, AND gates 400~404 and a reset circuit 407. Though processing similar to that executed by the arrangement of FIG. 27 is executed, the operation carried out takes the following point into consideration: Specifically, since actual image data does not exist at the boundary of image data, a dummy image must be inserted in accordance with a boundary rule, as set forth in ISO/IEC (Committee Draft 11544).

In order to simplify the description, the description will be rendered in accordance with the boundary rule set forth in ISO/IEC (Committee Draft 11544), the binary image data will be composed of black and white, "0" will be the logical value for white, and "1" will be the logical value for black.

The boundary rule is as follows:

It is assumed that there is white ("0") bordering on the upper, left and right sides of an actual image.

A reference pixel in a stripe below a pixel currently undergoing processing is enlarged a necessary amount downwardly on the lower side of the image by repeating pixels in a final line of the stripe currently being processing.

Figure 33:
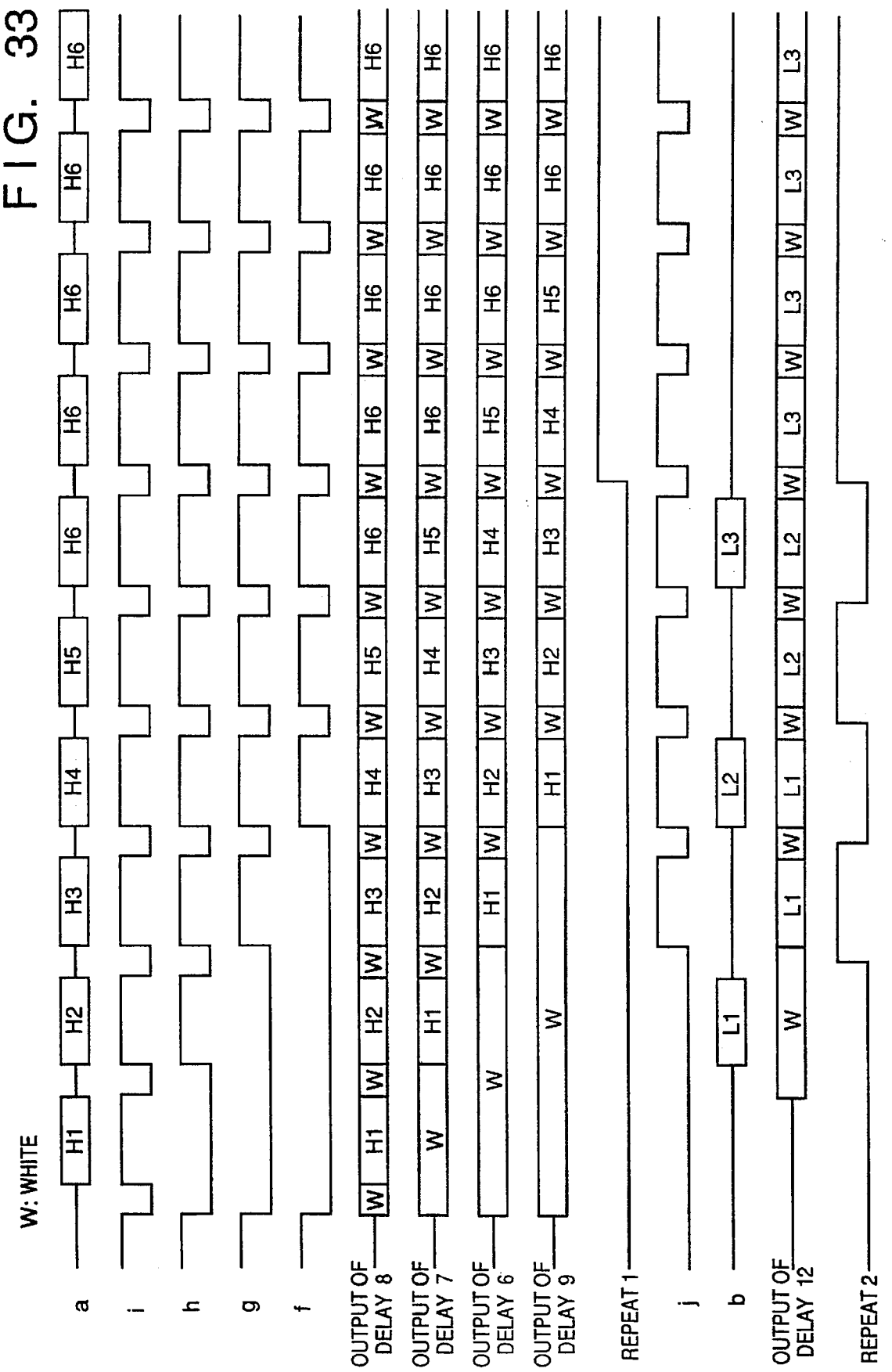
FIG. 33 is a timing chart illustrating the operation of the 11th embodiment.
Figure 34:
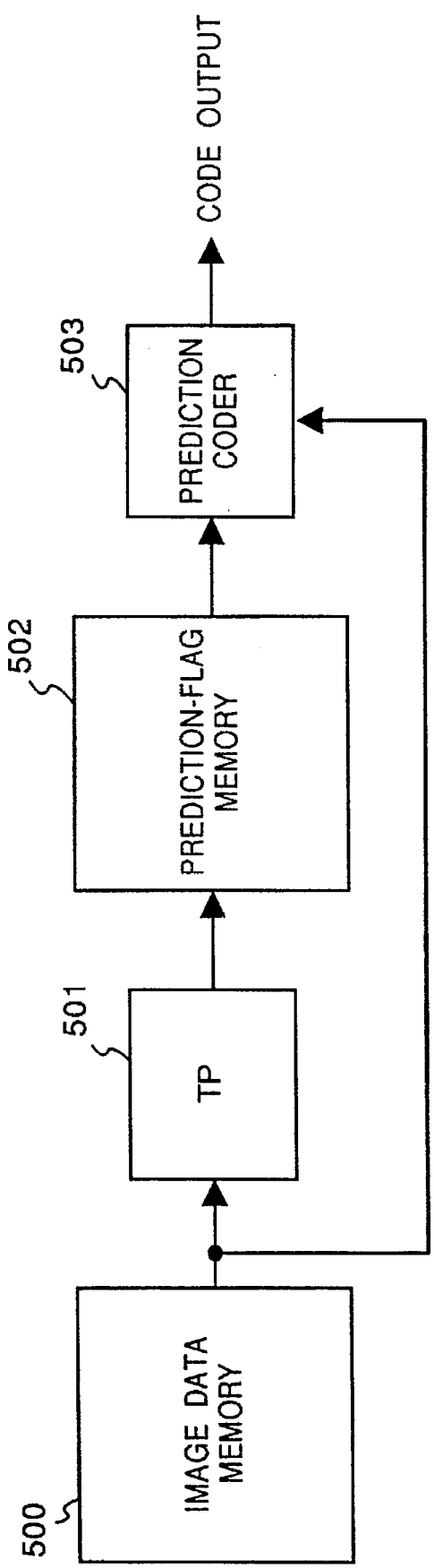
FIG. 34 is a block diagram showing the configuration of a coding apparatus.

The operation of the apparatus shown in FIG. 32 will be described in accordance with the foregoing premise. FIG. 33 illustrates a timing chart showing the flow of processing executed by this apparatus.

At the start of coding, Repeat 1 and Repeat 2 select the L side of the multiplexers 405, 406. In order to simplify the description, it is assumed that the number of lines on the high-resolution side is six and that the images on respective ones of these lines are $H_1$~$H_6$.

When Repeat 1 is at the low level, high-resolution image data from the terminal a enters an AND gate 403 and a signal i assumes the low level at both ends of the actual image. As a result, the output of delay 8 becomes as shown in FIG. 33. This is equivalent to an image having white bordering on its left and right sides. The image data that has passed through the delay 8 is used in generating reduced data. Signal h is at the low level until $H_1$ is read in from terminal a. Therefore, the output of delay 7 is always white ("0") during the time that the output of delay 8 is $H_1$. Similarly, since the signals g, f are at the low level for periods of time of two lines and three lines, respectively, from the start, the outputs of delays 8, 7, 6, 9 become as shown in FIG. 33.

The start of operation of the coder 3 in FIG. 33 is when the output of the delay 6 is $H_1$, at which time the output of delay 9 is always white. Accordingly, processing can be executed on the assumption that white bordering is present on the upper side of the actual image. Repeat 1 attains the high level after $H_6$ enters from terminal a, and the multiplexer 405 selects the H side. As a result, $H_6$ is circulated, as shown in FIG. 33.

By virtue of this operation, the image on the final line can be enlarged in the downward direction. As a result, processing can be executed on the assumption that there is data on the lower side, even when the actual image ends. In a case where the final line of the stripe immediately above is referred to in coding processing of the next stripe, processing can be executed while referring to $H_6$, which is the final line of the previous stripe, if the signals f, g, h are made reset signals identical with the signal i of FIG. 33.

Processing on the low-resolution side will be described next. In order to simplify the description, a case will be discussed in which one low-resolution pixel is generated with respect to two high-resolution pixels in the main-scan direction and two high-resolution pixels in the sub-scan direction, for a total of four pixels.

As illustrated in FIG. 33, a low-resolution image $L_1$ is generated when the output of delay 7 becomes $H_1$ and the output of delay 8 becomes $H_2$. When it is time for processing of the next line, $L_6$ still cannot be generated. Therefore, Repeat 2 attains the high level, the multiplexer 406 selects the H side, $L_1$ is circulated again and the output of delay 12 becomes as shown in FIG. 33.

When $L_2$ starts being outputted from terminal b, Repeat 2 assumes the low level and the multiplexer 406 selects the L side. The same operation is then repeated. When generation of reduced image data $L_3$ ends, Repeat 2 becomes fixed at the high level and L3 is circulated. Resetting in the main-scan direction is as indicated by signal j. The end result is that the output of delay 12 is as shown in FIG. 33.

In the description set forth above, image data is circulated by the multiplexers 405, 406. However, the image data circulated can be brought from another output, or a plurality of multiplexers for circulation may be combined and the final two lines, for example, may be repeatedly circulated.

It goes without saying that the AND gates 400~404, for generating the white image by the resetting operation, can be realized by other logic device.

In the third to 11th embodiments, as described above, image data can be coded or decoded at high speed independently of processing for improving coding efficiency or processing for transforming resolution.

The present invention is not limited to the foregoing embodiments but can be modified and applied in a variety of ways within the scope of the claims. In particular, the methods employed in the foregoing embodiments may be combined in any manner, and any combination of the approaches used in the foregoing embodiments is covered by the concept of the invention.

What is claimed is:

1. A coding method for hierarchically coding an image, comprising:

a transforming step of transforming a plurality of mutually adjacent pixels in a first image into a pixel of a second image which has a resolution lower than that of the first image;

a determining step of successively determining whether or not each of pixels in a plurality of consecutive lines in the first image is a predictable pixel which can be predicted based on a plurality of pixels in the second image;

a setting step of setting a first flag and a second flag in accordance with the determination result obtained in said determining step, the first flag being representative of whether a pixel which is not the predictable pixel exists in the plurality of consecutive lines in the first image, and the second flag being representative of whether each of pixels in the plurality of consecutive lines in the first image is the predictable pixel; and a coding step of coding, after the first flag and the second flag corresponding to the plurality of consecutive lines are set in said setting step, each of pixels in the plurality of consecutive lines in the first image in accordance with the first flag and the second flag, without performing a determination again in said determining step.

2. A coding apparatus for hierarchically coding an image, comprising:

transforming means for transforming a plurality of mutually adjacent pixels in a first image into a pixel of a second image which has a resolution lower than that of the first image;

determining means for successively determining whether or not each of pixels in a plurality of consecutive lines in the first image is a predictable pixel which can be predicted based on a plurality of pixels in the second image;

setting means for setting a first flag and a second flag in accordance with the determination result of said determining means, the first flag being representative of whether a pixel which is not the predictable pixel exists in the plurality of consecutive lines in the first image, and the second flag being representative of whether each of pixels in the plurality of consecutive lines in the first image is the predictable pixel; and coding means for coding, after the first flag and the second flag corresponding to the plurality of consecutive lines are set by said setting means, each of pixels in the plurality of consecutive lines in the first image in accordance with the first flag and the second flag, without performing a determination again by said determining means.

3. The apparatus according to claim 2, wherein said setting means sets the first flag in a unit of two consecutive lines.

4. The apparatus according to claim 2, wherein said setting means sets the second flag for a plurality of pixels consisting of 2×2 pixels.

5. The apparatus according to claim 2, wherein said determining means determines whether or not values of the mutually adjacent pixels in the first image coincides with values of pixels in the second image.

6. The method according to claim 1, wherein, in said determining step, a determination is made as to whether or not a first pixel of interest in the first image can be predicted based on the pixels in the second image, the pixels in the second image including a second pixel of interest which corresponds to the pixels in the first image and pixels adjacent to the second pixel of interest.

7. The apparatus according to claim 2, wherein said coding means codes the first image by a prediction coding method.

8. The apparatus according to claim 2, wherein said coding means excludes a pixel from coding operation in the first image in accordance with a state of the first flag and a state of the second flag.

9. The apparatus according to claim 2, wherein said determining means determines whether or not a first pixel of interest in the first image can be predicted based on the pixels in the second image, the pixels in the second image including a second pixel of interest which corresponds to the pixels in the first image and pixels adjacent to the second pixel of interest.

* * * * *